Oct. 11, 1938. A. RAMBOLD Re. 20,881

MACHINE FOR MAKING, FILLING, CLOSING, AND WRAPPING BAGS

Original Filed May 2, 1936 20 Sheets-Sheet 1

INVENTOR
ADOLF RAMBOLD
By John B. Brady
ATTORNEY

Oct. 11, 1938. A. RAMBOLD Re. 20,881

MACHINE FOR MAKING, FILLING, CLOSING, AND WRAPPING BAGS

Original Filed May 2, 1936 20 Sheets-Sheet 2

INVENTOR
ADOLF RAMBOLD
BY
John C. Brady
ATTORNEY

MACHINE FOR MAKING, FILLING, CLOSING, AND WRAPPING BAGS
Original Filed May 2, 1936 20 Sheets-Sheet 3
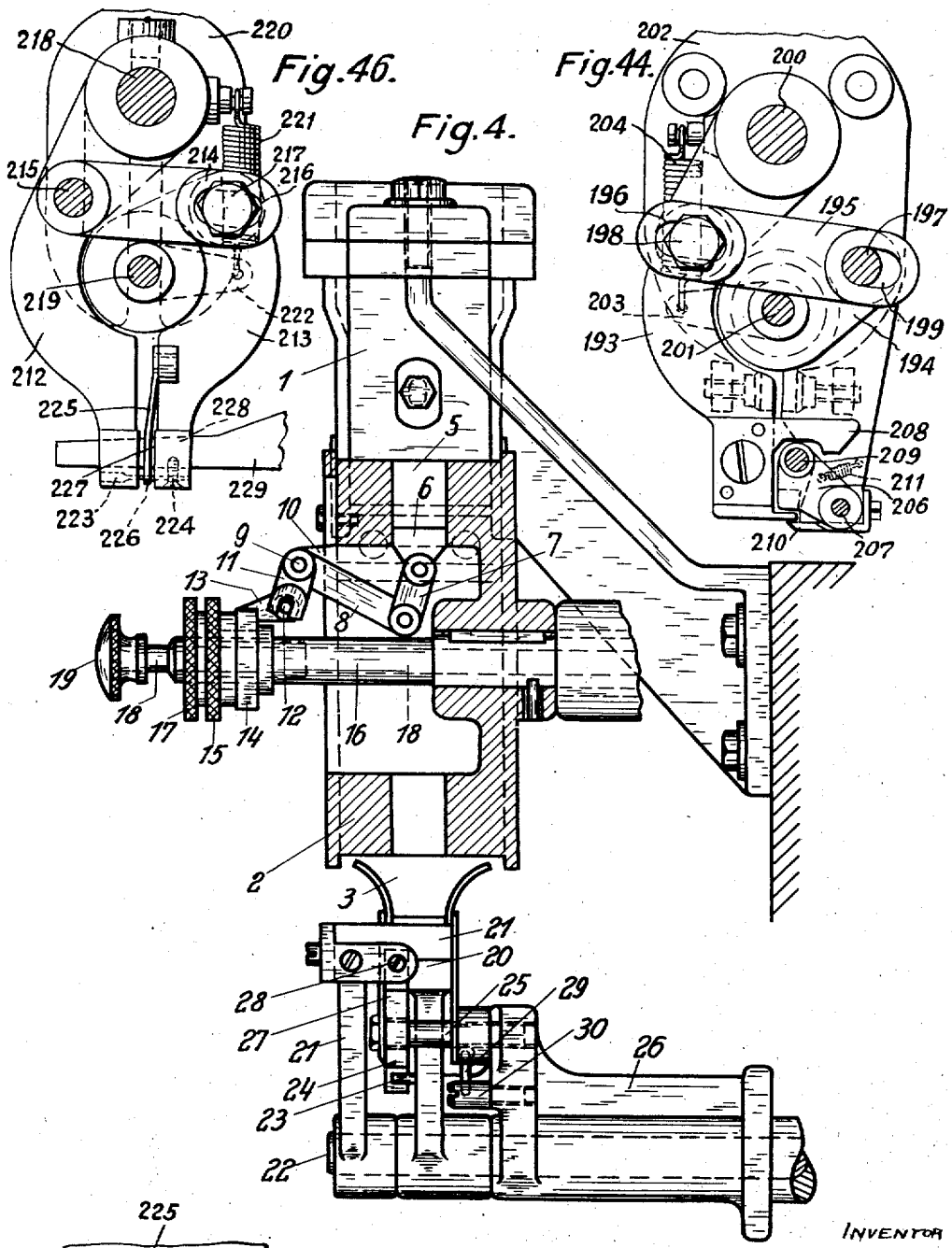
INVENTOR
ADOLF RAMBOLD
BY John A. Brady
ATTORNEY Oct. 11, 1938. A. RAMBOLD Re. 20,881
MACHINE FOR MAKING, FILLING, CLOSING, AND WRAPPING BAGS
Original Filed May 2, 1936 20 Sheets-Sheet 4
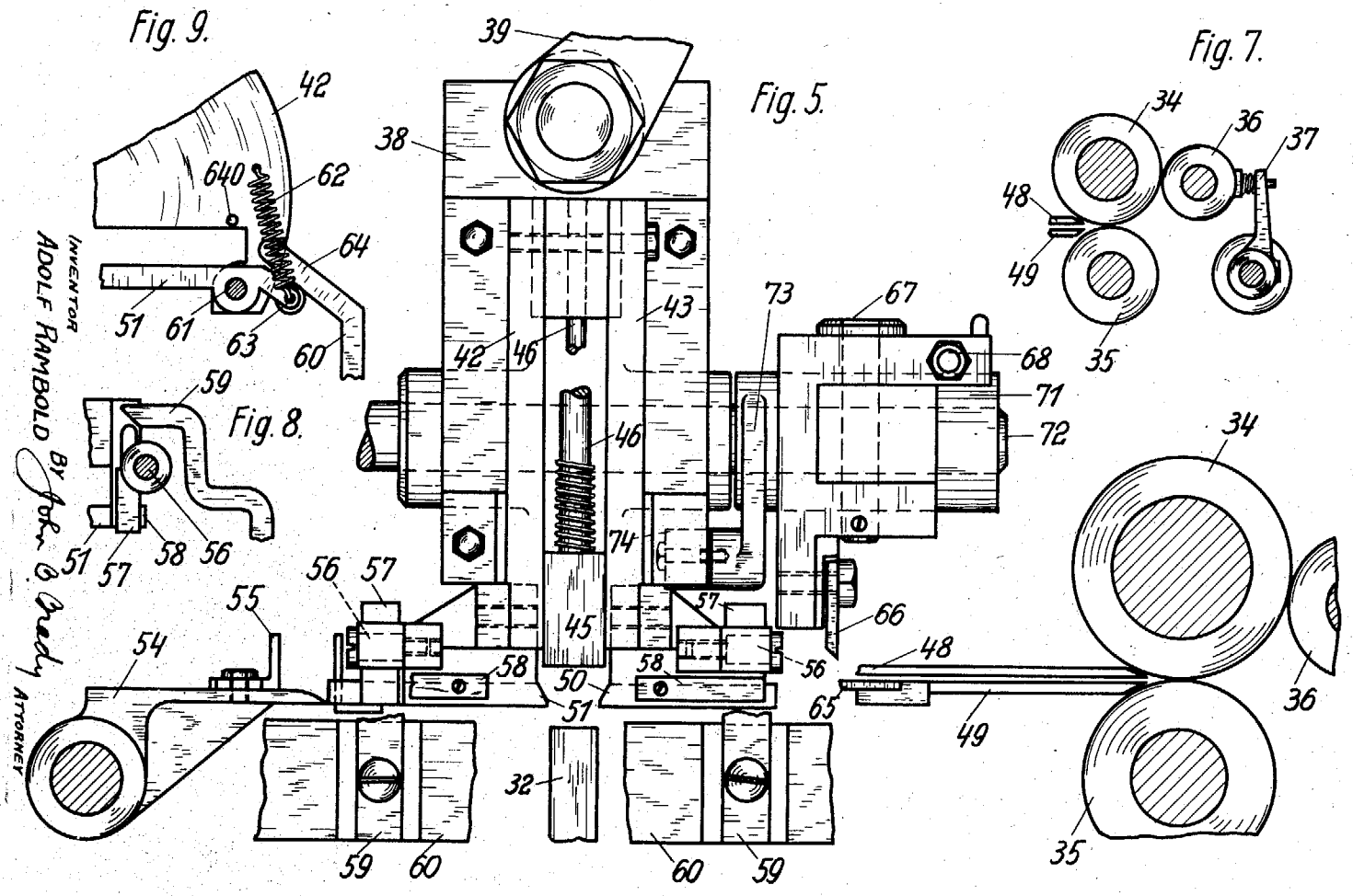

Oct. 11, 1938. A. RAMBOLD Re. 20,881
MACHINE FOR MAKING, FILLING, CLOSING, AND WRAPPING BAGS
Original Filed May 2, 1936 20 Sheets-Sheet 5
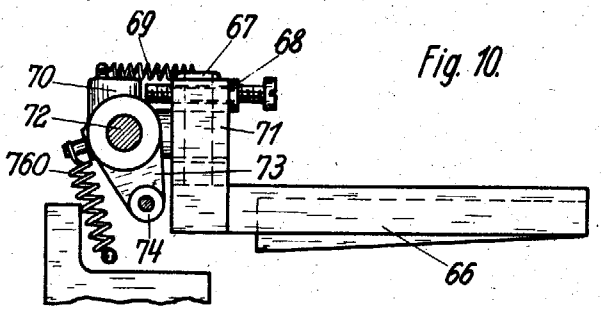
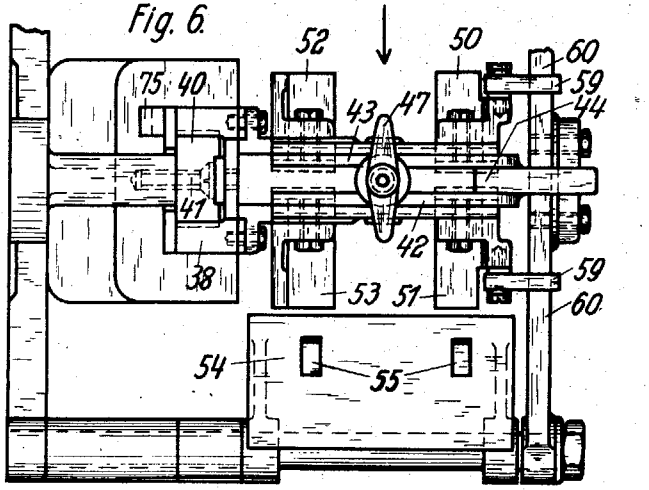
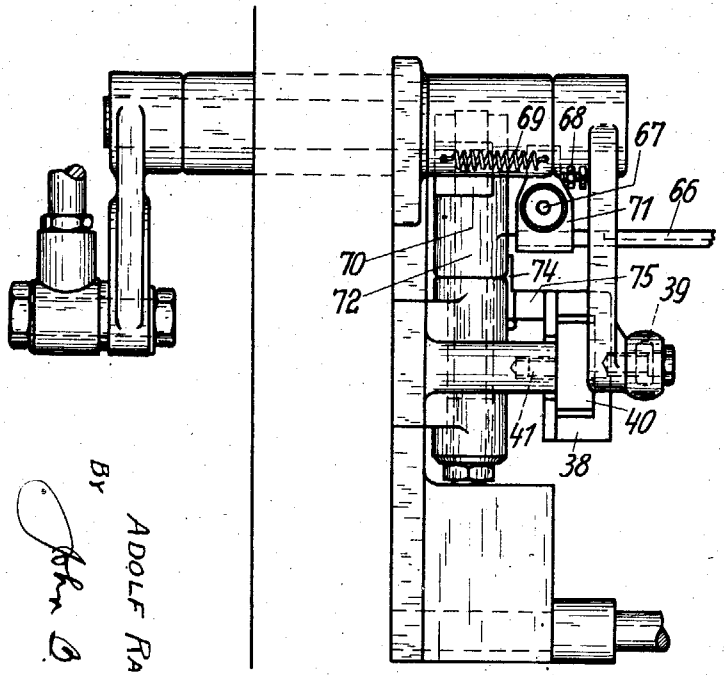
INVENTOR
ADOLF RAMBOLD
BY
John B. Brady
ATTORNEY Oct. 11, 1938. A. RAMBOLD Re. 20,881
MACHINE FOR MAKING, FILLING, CLOSING, AND WRAPPING BAGS
Original Filed May 2, 1936 20 Sheets-Sheet 6
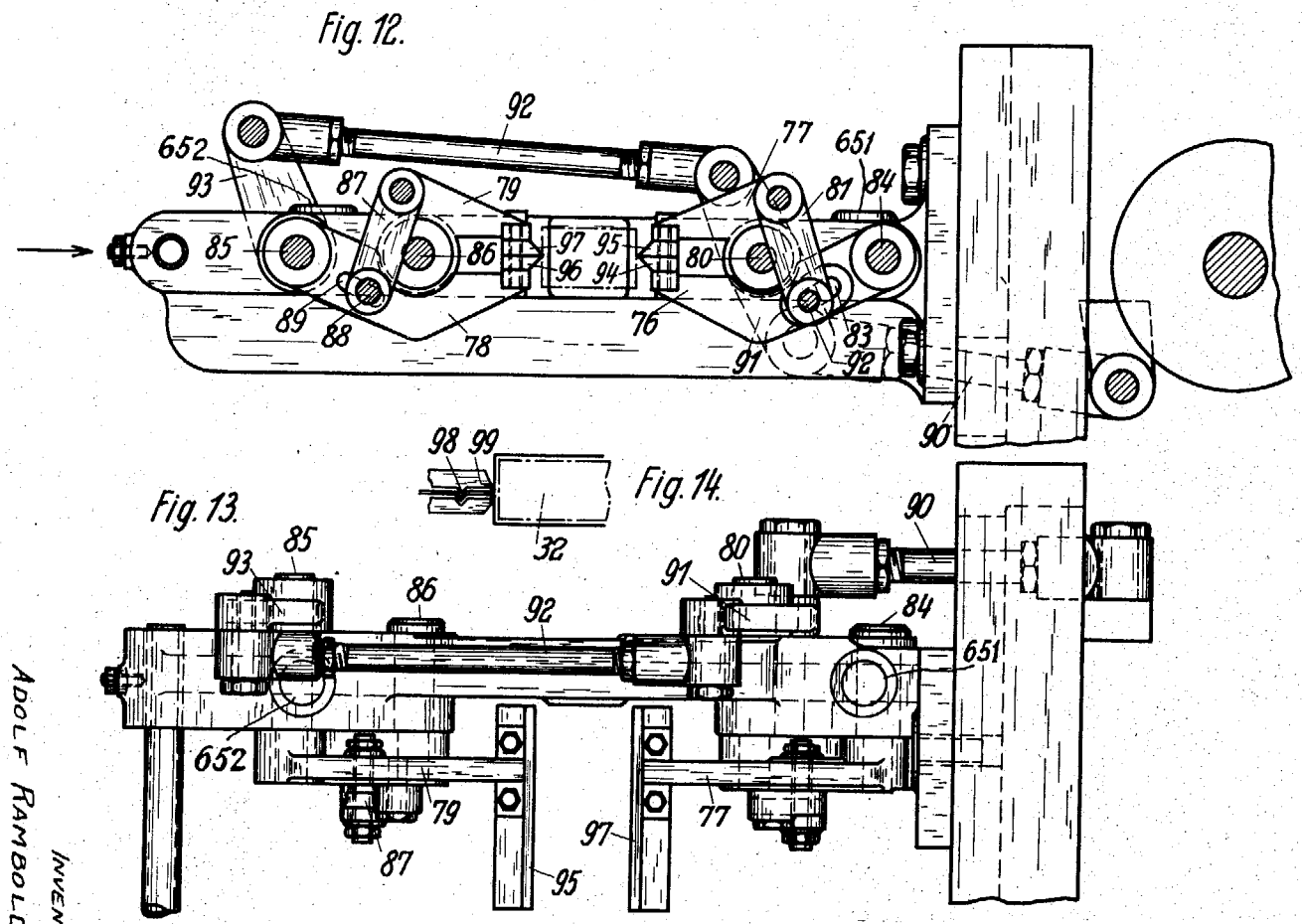
INVENTOR
ADOLF RAMBOLD
BY John C. Brady
ATTORNEY

MACHINE FOR MAKING, FILLING, CLOSING, AND WRAPPING BAGS

Original Filed May 2, 1936 20 Sheets-Sheet 7

INVENTOR
ADOLF RAMBOLD
By John B. Brady
ATTORNEY

MACHINE FOR MAKING, FILLING, CLOSING, AND WRAPPING BAGS
Original Filed May 2, 1936 20 Sheets-Sheet 8
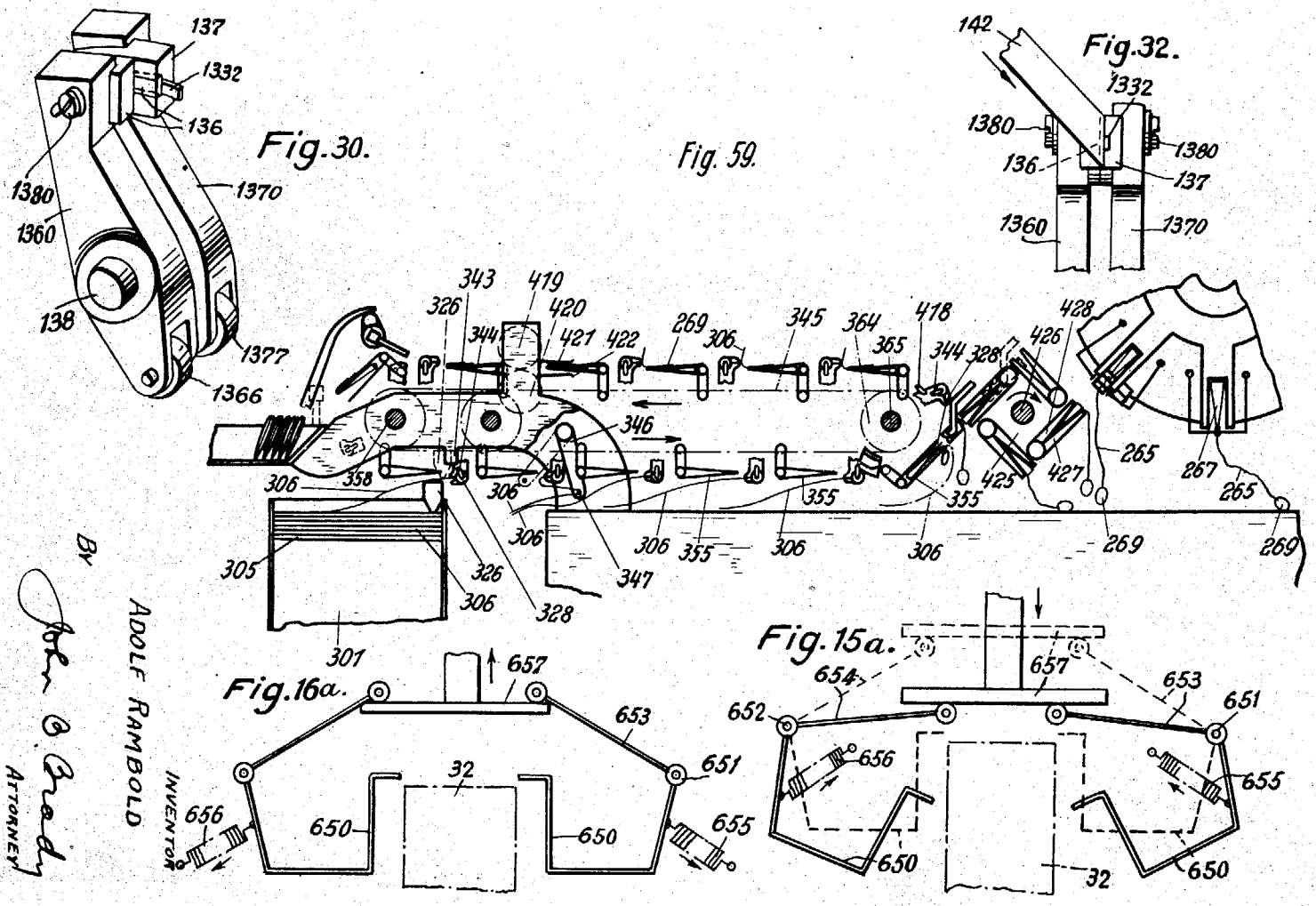
INVENTOR
ADOLF RAMBOLD
BY John O. Brady
ATTORNEY Oct. 11, 1938. A. RAMBOLD Re. 20,881
MACHINE FOR MAKING, FILLING, CLOSING, AND WRAPPING BAGS
Original Filed May 2, 1936 20 Sheets-Sheet 9
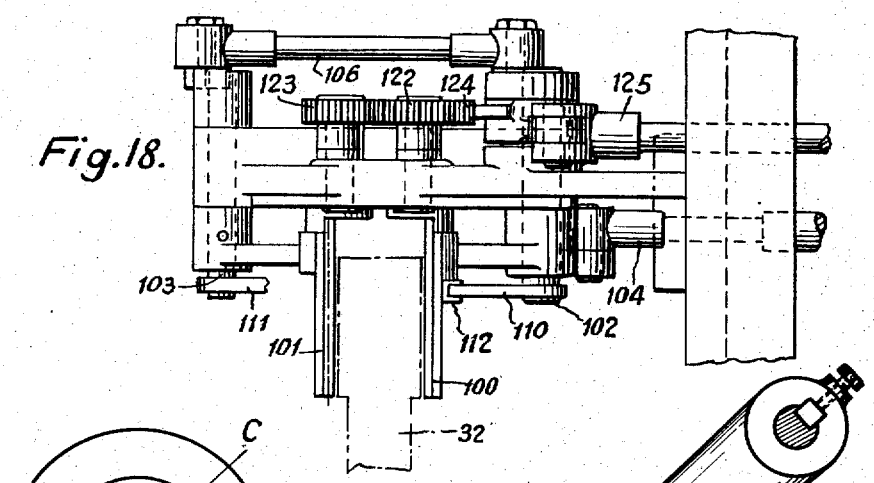
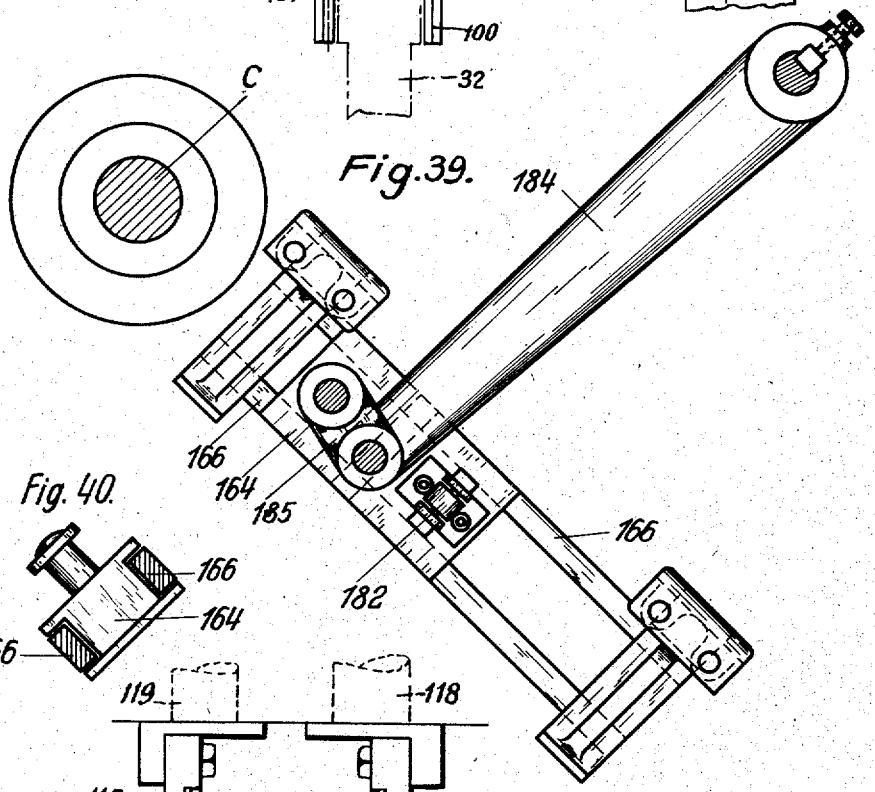
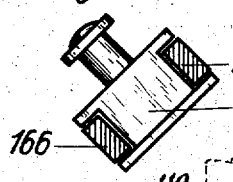
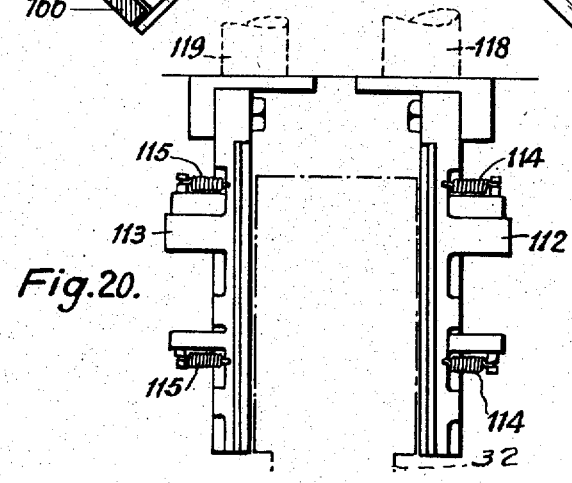
INVENTOR
ADOLF RAMBOLD
BY
John B. Brady
ATTORNEY MACHINE FOR MAKING, FILLING, CLOSING, AND WRAPPING BAGS
Original Filed May 2, 1936 20 Sheets-Sheet 10
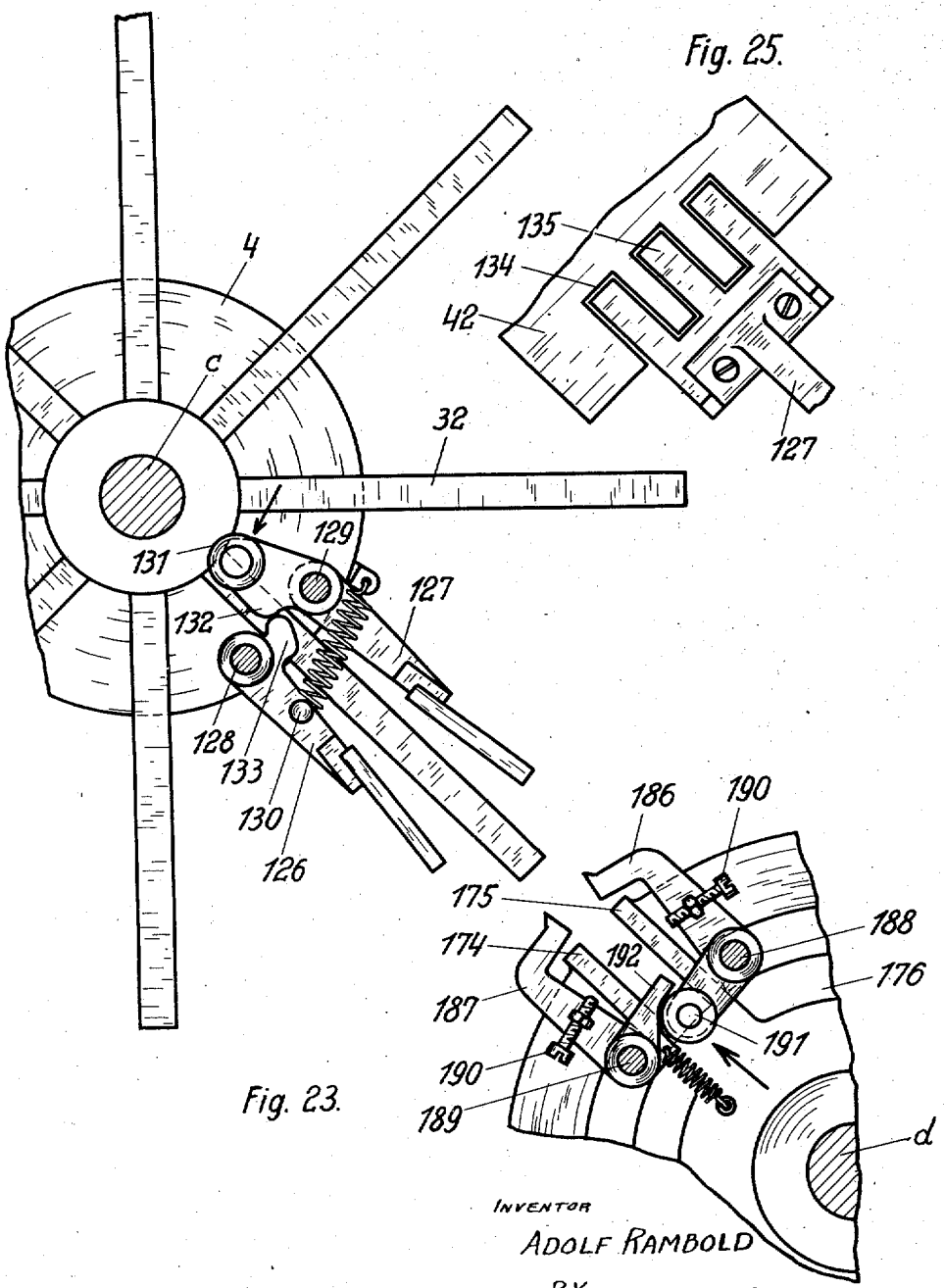
INVENTOR
ADOLF RAMBOLD
BY John B. Brady
ATTORNEY

MACHINE FOR MAKING, FILLING, CLOSING, AND WRAPPING BAGS

Original Filed May 2, 1936 20 Sheets-Sheet 11

INVENTOR

ADOLF RAMBOLD

BY

John B. Brady

ATTORNEY

MACHINE FOR MAKING, FILLING, CLOSING, AND WRAPPING BAGS

Original Filed May 2, 1936 20 Sheets-Sheet 12

INVENTOR
ADOLF RAMBOLD
BY
John B. Brady
ATTORNEY

Oct. 11, 1938. A. RAMBOLD Re. 20,881

MACHINE FOR MAKING, FILLING, CLOSING, AND WRAPPING BAGS

Original Filed May 2, 1936 20 Sheets-Sheet 13

INVENTOR
ADOLF RAMBOLD
BY
John B. Brady
ATTORNEY

Oct. 11, 1938. A. RAMBOLD Re. 20,881

MACHINE FOR MAKING, FILLING, CLOSING, AND WRAPPING BAGS

Original Filed May 2, 1936 20 Sheets-Sheet 14

INVENTOR
ADOLF RAMBOLD
BY
John C. Brady
ATTORNEY

MACHINE FOR MAKING, FILLING, CLOSING, AND WRAPPING BAGS

Original Filed May 2, 1936 20 Sheets-Sheet 15

INVENTOR
ADOLF RAMBOLD
BY
John B. Brady
ATTORNEY

Oct. 11, 1938. A. RAMBOLD Re. 20,881
MACHINE FOR MAKING, FILLING, CLOSING, AND WRAPPING BAGS
Original Filed May 2, 1936 20 Sheets-Sheet 16
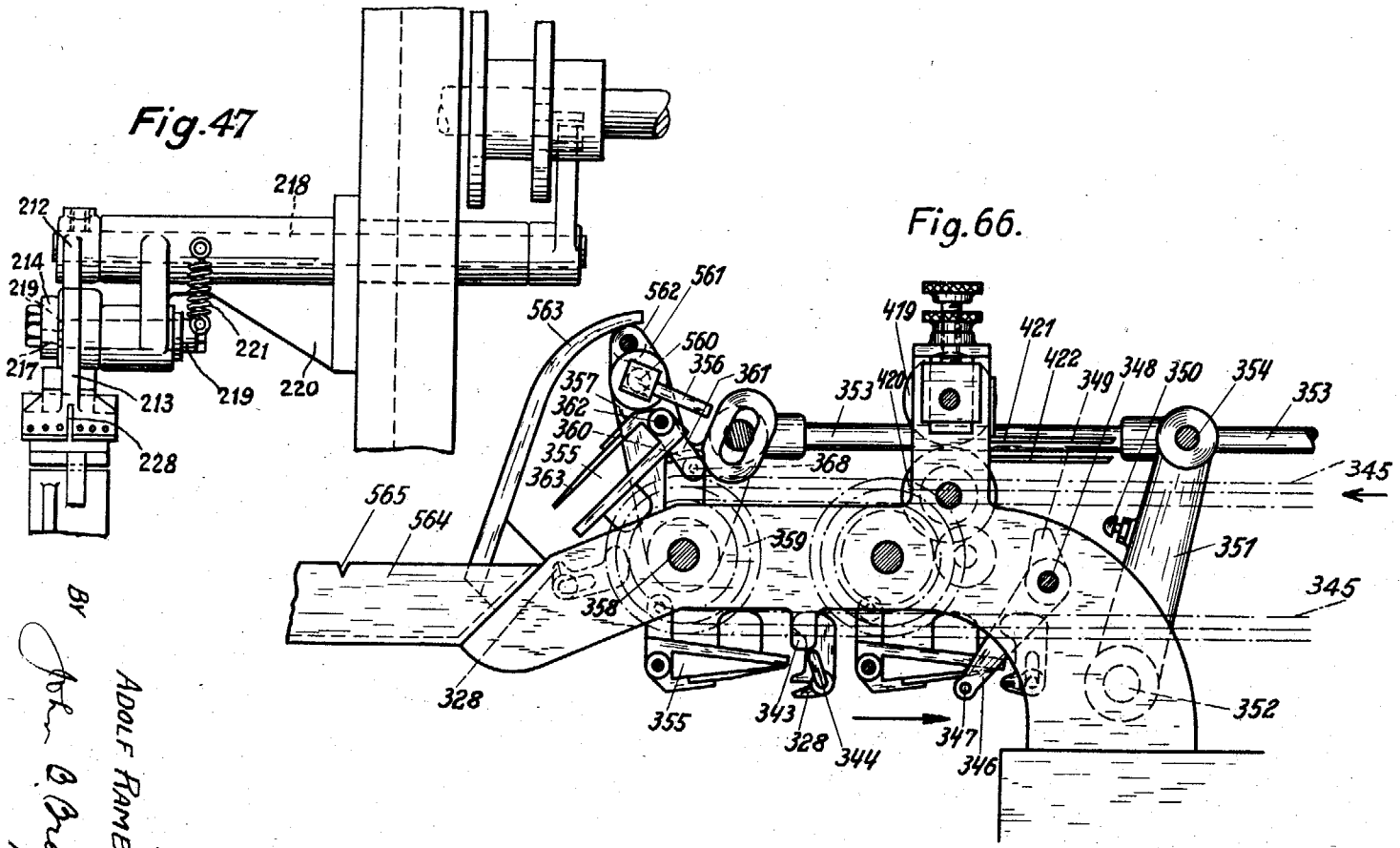
INVENTOR
ADOLF RAMBOLD
BY John C. Brady
ATTORNEY MACHINE FOR MAKING, FILLING, CLOSING, AND WRAPPING BAGS
Original Filed May 2, 1936 20 Sheets-Sheet 17
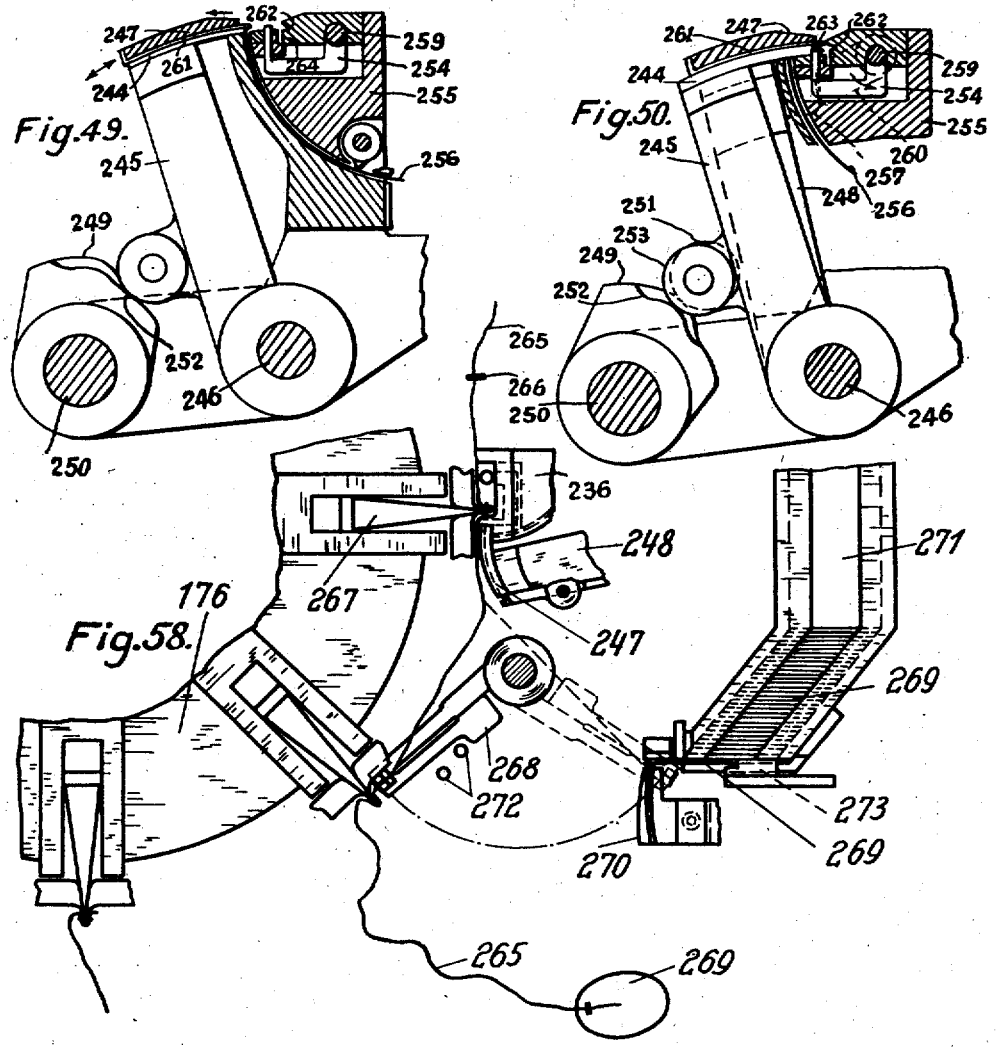
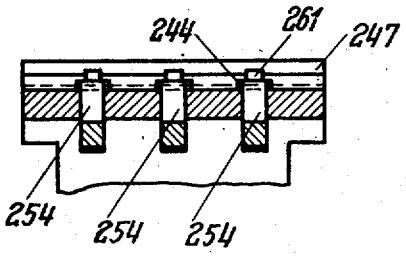
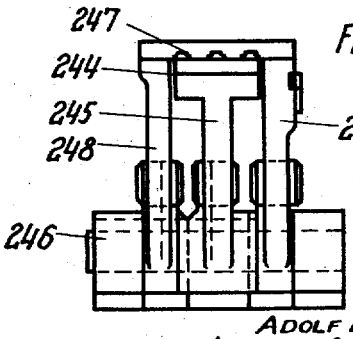
INVENTOR
ADOLF RAMBOLD
By John B. Brady
ATTORNEY

MACHINE FOR MAKING, FILLING, CLOSING, AND WRAPPING BAGS

Original Filed May 2, 1936 20 Sheets-Sheet 18

INVENTOR
ADOLF RAMBOLD By John B. Grady ATTORNEY

Oct. 11, 1938. A. RAMBOLD Re. 20,881

MACHINE FOR MAKING, FILLING, CLOSING, AND WRAPPING BAGS

Original Filed May 2, 1936 20 Sheets-Sheet 19

INVENTOR
ADOLF RAMBOLD

BY John O. Brady
ATTORNEY

MACHINE FOR MAKING, FILLING, CLOSING, AND WRAPPING BAGS

Original Filed May 2, 1936 20 Sheets-Sheet 20

INVENTOR
ADOLF RAMBOLD By John C. Grady ATTORNEY

Reissued Oct. 11, 1938

Re. 20,881

UNITED STATES PATENT OFFICE 20,881

MACHINE FOR MAKING, FILLING, CLOSING, AND WRAPPING BAGS

Adolf Rambold, Dresden, Germany

Original No. 2,083,124, dated June 8, 1937, Serial No. 77,580, May 2, 1936. Application for reissue April 20, 1938, Serial No. 203,209. In Germany May 13, 1935

95 Claims. (Cl. 93—4)

This invention relates to a machine for making, filling, closing and wrapping bags, particularly adapted to receive granular substances.

One object of the invention is to provide such a machine capable of rapid operation.

Another object of the invention is to provide a machine for making infusion bags filled and individually wrapped ready for sale, of cellulose film, aluminum foil, paper or other material.

Still another object is to provide a machine for making "glueless" bags each by folding and stapling a rectangular blank, the blank being folded about a rectangular core and then the overhanging edges at the narrow sides of the core and later the upper edges of the bag being twice folded together in such a manner that the greatest possible number of layers of material is provided for the stapling, with a view to producing tight seams.

It has already been proposed to provide packing machines which include vertically disposed hollow core wheels rotatable step-by-step around horizontal axes, the mechanisms for forming the open bags and for filling the hollow cores being disposed horizontally around said wheels. In these machines the substance with which the bags are to be filled must be introduced horizontally into the cavity of the cores.

As compared with these proposed machines one distinguishing feature of the present invention is that with the axis of the core wheel disposed horizontally the axes of the hollow cores extend radially and the filling device is so arranged with reference to the wheel that the substance is introduced into the hollow cores prior to the formation of the bags, the substance being preferably introduced into the respective cores when same assume an inclined position.

In addition to saving space important advantages are secured by filling the hollow cores prior to the formation of the bags, since by so proceeding it becomes possible to effect the formation and closing of the bags without interruption. This is effected at what may be designated station A.

A dosing device, easily adjusted to the weight required, is disposed under the filling hopper and the substance to be packed, e. g. tea, is caused to pass from the dosing drum into a small intermediate container, whence it passes into the hollow core which happens to be at station A. Upon completion of the dosing the substance falls on to a filling plunger. When the filling plunger is retracted, i. e. when the feed opening to the hollow core is uncovered, the substance is loosened by this movement, so that no congestion and no choking can occur at the entrance to the hollow core, the substance entering the hollow core with a steady, gentle drop. The inclined position of the hollow core has the effect that the substance enters same almost on its own accord, so that it cannot be damaged by the moving filling plunger.

If the substance to be packed is tea, this careful treatment is particularly useful on account of its brittle or friable nature. The hollow core filled with tea is now advanced as by a Maltese gear to the first folding station which may be designated B.

Station B embodies another feature of the invention. According to this feature the paper or other bag material is introduced in an inclined position, i. e. on a suitable surface downwardly from above and is brought in front of the hollow core which is located at right angles to the feed. (Hitherto, the material for the formation of the bags has been introduced horizontally or from below upwards, but not at a gentle slope.) The inclined position is particularly important in the case of thin bag material, such as cellulose film, taking into account the high speed of the machine. This material, perforated or pervious for infusion bags, and disposed say on the left above is fed to station B with the aid of feed rollers, severed, and placed about the hollow core in U-form, being held thereto with the aid of clamping levers.

At the next station designated C the folded side seams of the bag are produced with the aid of folding tongs. Owing to the novel arrangement and construction of the folding tongs the side seams may be produced at a single operating station, after the overhanging edges of the blank have been pressed together, in this case at the narrow sides of the core, in the middle. By means of this arrangement it is also possible to produce a treble fold, provided the edges of the blank for forming the bag projecting perpendicularly from the centre line of the narrow side of the core are of sufficient length. A feature of the arrangement is that the folding tongs are mounted on axles which, in turn, are eccentrically disposed on positively driven rotating shafts in such a manner that the mouth of the tongs terminates at the level of the centre line of the core's narrow side.

At the next station designated D both side seams are stapled. The particular feature of the stapling station D is the solution of the problem of providing a particularly quick action stapling device capable of simultaneously fixing several staples in close proximity. Smooth, unprepared sheet metal strip is used as raw material for the staples and fed forward at each operative stroke, in known manner, the width of one staple. This has the advantage that, instead of drums with several rows of wire, only a single sheet metal strip drum with one row is required for the same output, the feed strokes being very small, which leads to simplification of the construction.

The stapling device is constructed in known manner with swinging arms in such a way that the staple forming member and the staple plunger together with their guides are also arcuate, the staple forming member comprising a single piece only, which is important in view of its function referred to hereinafter, as cutting edge.

The staple forming member and staple plunger are adjustably and detachably mounted on their rocking arms. This is important for the reason that according to a further feature of the invention the staple forming member together with the plunger for driving in the staple forms a common cutting edge during the severing operation.

If it were desired to introduce the sheet metal strip in such a manner that the length of the staple was obtained from the width of the strip, it would be necessary to provide a separate severing device on the stapling unit. But this would render a satisfactory operation problematic and in addition the construction would become extremely complicated. Alternatively, as proposed by this invention, the staple plunger and staple forming member are at the same time constructed as a severing device.

A resilient stop, preferably guided on the staple forming member, is provided for limiting the forward feed of the sheet metal. This is important, since the staple forming member and the staple plunger together act as a severing edge and therefore must be located above the entrance of the sheet metal when same is fed forward.

The resilient stop is offset from the cutting edge by the width of the staple and projects from the staple forming member to such an extent that the strip of sheet metal abuts against it when fed forward. When the staple forming member is applied during its operative stroke to the work to be stapled and its support, the stop is preferably resiliently withdrawn. Only stationary stops are known, which limit the forward movement of the wire.

At the next station designated E the bag so far completed is stripped from the hollow core and in this operation, owing to the inclined position which the core now occupies, the tea falls into the bag on its own accord. A feature of this station is that the stripping device comprises two opposed slides guided on rails, said slides having stripping blades rockably mounted thereon with their pivots so disposed that the point of intersection of the rocking paths of the stripping blades is located in the middle of the narrow sides of the core outside the level of the broad sides of the bag. When the narrow sides of the bag are folded inward by two opposed folding knives, the blade levers are applied with their forward tips to the middle of the narrow sides of the bag in such a manner that the measurement of the broad side of the bag determined by the folding of the bag blank about the core is maintained. By this means a separate operation is saved, because during the stripping both narrow sides of the bag are simultaneously folded inwardly.

After the stripping the bag is held fast by a clamp wheel disposed say on the right below and is forwarded thereby to the mouth folding station designated F.

While the principle of disposing devices for bag formation on a second wheel in addition to disposing such devices around the hollow core wheel may be known, the invention is further characterized in this respect by a clamp wheel for receiving the filled bags rotatable around a horizontal axis, closing stations being disposed around the clamp wheel and the stripping device at station E being disposed between the core wheel and the clamp wheel. The radial arrangement of the substance receiving chambers of the core wheel is also favourable in this connection, since due to the inclined position of the core the substance automatically falls into the bag formed therearound, so that the latter may be closed directly after stripping.

Station F includes the feature of a rockable folding plate on which is provided a cam cooperating with a presser plate for the folded bag portions.

The next station designated G comprises a device for pressing flat the mouth closure combined with means for pre-perforating the closure and a mouth closure stapling unit. The pre-perforating means is necessary when, inter alia for the purpose of saving material, there is employed very thin stapling wire which is incapable of penetrating the several layers of material produced by the folding. In addition to the means for pre-perforating the mouth fold the mechanism includes a feeling lever which operates to feel the bag passing through the device for pressing flat the pressing mouth closure and which if a bag is missed automatically cuts out the next staple feed.

The stapling unit is built up on the same principles as at station D, and moreover it is rockable around a shaft to make room when the mouth fold of the bag projecting from the bag holder clamp on the clamp wheel is brought before the stapling unit.

A holder string guided by the stapling head may be placed in loop form around the mouth of the bag when the stapling unit swings forward into its operative position. The withdrawal clears the way for the further rotation of the clamp wheel. The material necessary for the formation of the staples is supplied to the three part stapling device from aluminium band drums. In the same opertaion, i. e. simultaneously with the stapling, the aforesaid label string is then clamped fast in loop form and therefore twice, by means of the staple disposed in the middle of the bag mouth closure.

From a label pile disposed in front of the string reel, labels are detached one by one at the next station designated H by means disposed at say the extreme bottom on the right, the label being attached to the string by means of a round wire.

Thus, by passing through the stations A to H the stapled infusion bag is formed, filled, closed and completed with holder string and attached label or tag.

At succeeding stations J and K the infusion bag is wrapped in a protective covering or packing the constituent parts of which are connected together by crimping and which presents a folded flap, a feature being that the label of the wrapped bag sticks out only in part, e. g. to one third, from under the folded flap and thereby forms a handle for breaking open the wrapping envelope.

It is to be understood that the machine is suitable for packing articles not provided with holder string and label, although the main object is to pack articles in the manner referred to.

Preferably, therefore, the machine includes means for forming each outer wrapping from a rectangular blank which is automatically laid around the finished bag and is closed by crimping.

The finished bag is fed forward by a reversing wheel of the device, e. g. by a feed clamp wheel (station J), with the aid of tongs, and from here passes to gripping pockets disposed on a chain, above which the wrapping sheet is held by tongs, due to the cooperation of individual elements of the conveyor chain provided in the machine. The wrapping is pulled into the gripping pocket by the bag itself, wrapping itself around it, when the bag is introduced into the pocket by a push member. Owing to the inclined position of the tongs of the reversing wheel at this moment the label string hangs down over the bottom of the bag and by the introduction of the bag into the gripping pocket is pulled up on the bag in such a manner that the label is laid on the outer side of the gripping pocket.

Thus the string is automatically placed around the bag and takes up a position parallel to the longitudinal axis of the wrapping sheet, so that the label becomes located outside the folded up wrapping sheet.

As the conveyor band continues its movement the upper edge of the sheet takes up a position at an acute angle to the axis of the bag owing to the latter position of the paper plier heads to the gripping pocket, which are disposed alternately in series on a conveyor chain or band.

Guide plates disposed in the path of movement fold over the upper edge of the wrapping entirely and hold the side edges of the wrapping together prior to these running through the crimping wheels, which connect together the open edges of the folded wrapping sheet.

Another feature of the invention resides in the construction of the wrapping sheet pile and the feed of the wrapping sheets to the holder tongs on the conveyor chain.

The wrapping paper is sucked off the paper pile and is fed to paper tongs of which say twelve are disposed on a conveyor chain. On this conveyor chain are also disposed a similar number of bag holders, into which the finished infusion bags are individually introduced, the paper being placed simultaneously around the bags. The paper wrapped around a bag now passes through a crimping device and thence it moves to the delivery station provided. At this station the finished article is discharged from the bag clamps, so that the operators may remove same in groups of five, ten or more each time.

The machine produces bags by individually folding and stapling rectangular blanks, each blank being folded for the purpose of producing tight seams, purely by stapling, in U-form around a rectangular core, whereupon the edges projecting preferably beyond the narrow sides of the core are folded in such a manner that the greatest possible number of layers results. At the same time the bottom portions overhanging the core on both sides are either laid between the side walls to be folded so that these bottom portions are twice folded therewith, or the bottom portions are pressed downwards, forming downwardly projecting corners, which are converted to flaps when the edges of the blank projecting preferably on the narrow sides beyond the core are folded, said flaps being bent up and back into the plane of the narrow sides of the core after the folding.

All folding and closing points are secured by staples where same are able to engage the greatest possible number of layers.

The holder string, if provided, is placed in loop form with one end over the edge of the filled and closed bag, thus being engaged by a staple at two points.

If the bag is an infusion bag same is brought with its bottom in front of the upper half of the wrapping sheet blank.

The holder string of the bag is placed parallel to the longitudinal axis over the lower inner half of the wrapping sheet in such a manner that the label becomes located outside the boundary of the sheet, and when the lower part of the sheet is folded up upon the bag the label is automatically laid on the outer side of the lower upwardly folded half of the wrapping sheet blank, upon which is folded in overlapping manner the part of the blank projecting over the upper edge of the bag, whereupon the edges are crimped together.

Other features of the invention will be referred to as the description proceeds.

In the accompanying drawings an embodiment of the invention is illustrated by way of example.

Fig. 1 is a general view of the machine, which includes ten stations.

Station A is the filling station and is illustrated in detail in Figs. 2 to 4.

Fig. 4 is a side elevation of the parts shown in Fig. 2 partly in section.

Station B is the feed and pre-folding station for the bag material (hereinafter referred to as paper) and is illustrated in detail in Figs. 5 to 11.

Fig. 5 is a side elevation of the device for prefolding the paper around the core of the core wheel and of the device for severing the paper.

Fig. 6 is a plan view of the device shown in Fig. 5, drawn to a smaller scale.

Fig. 7 shows the paper feed roller.

Figs. 8 and 9 show different forms of the paper applying angle.

Fig. 10 shows the construction of the severing knife.

Fig. 11 shows, in addition to the knife head, part of the devices illustrated in Fig. 6, on a larger scale.

Station C is the folding station and is illustrated in detail in Figs. 12 to 25.

Figs. 12 to 14 illustrate the device for precreasing the edges of the blank that project laterally beyond the core.

Fig. 12 is a side elevation.

Fig. 13 is a plan view of the device, and

Fig. 14 is a diagrammatic illustration of the action.

Figs. 15, 15*a* and 16, 16*a* are diagrams showing the manner of folding inwardly or outwardly the corner formed by the projecting edges of the blank.

Figs. 17 to 22 show means for folding together and folding down on to the bag the edges of the paper that project laterally from the narrow sides of the core.

Figure 1:
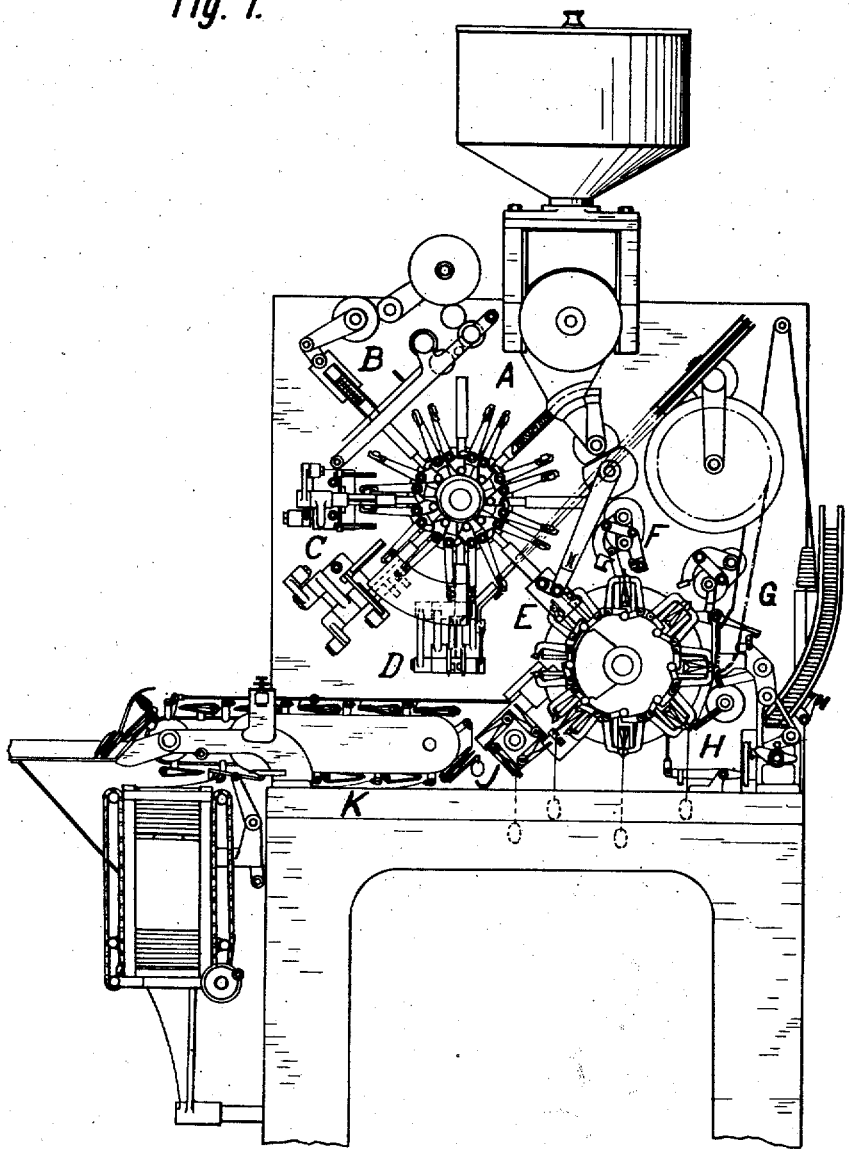
Figures 2, 3:
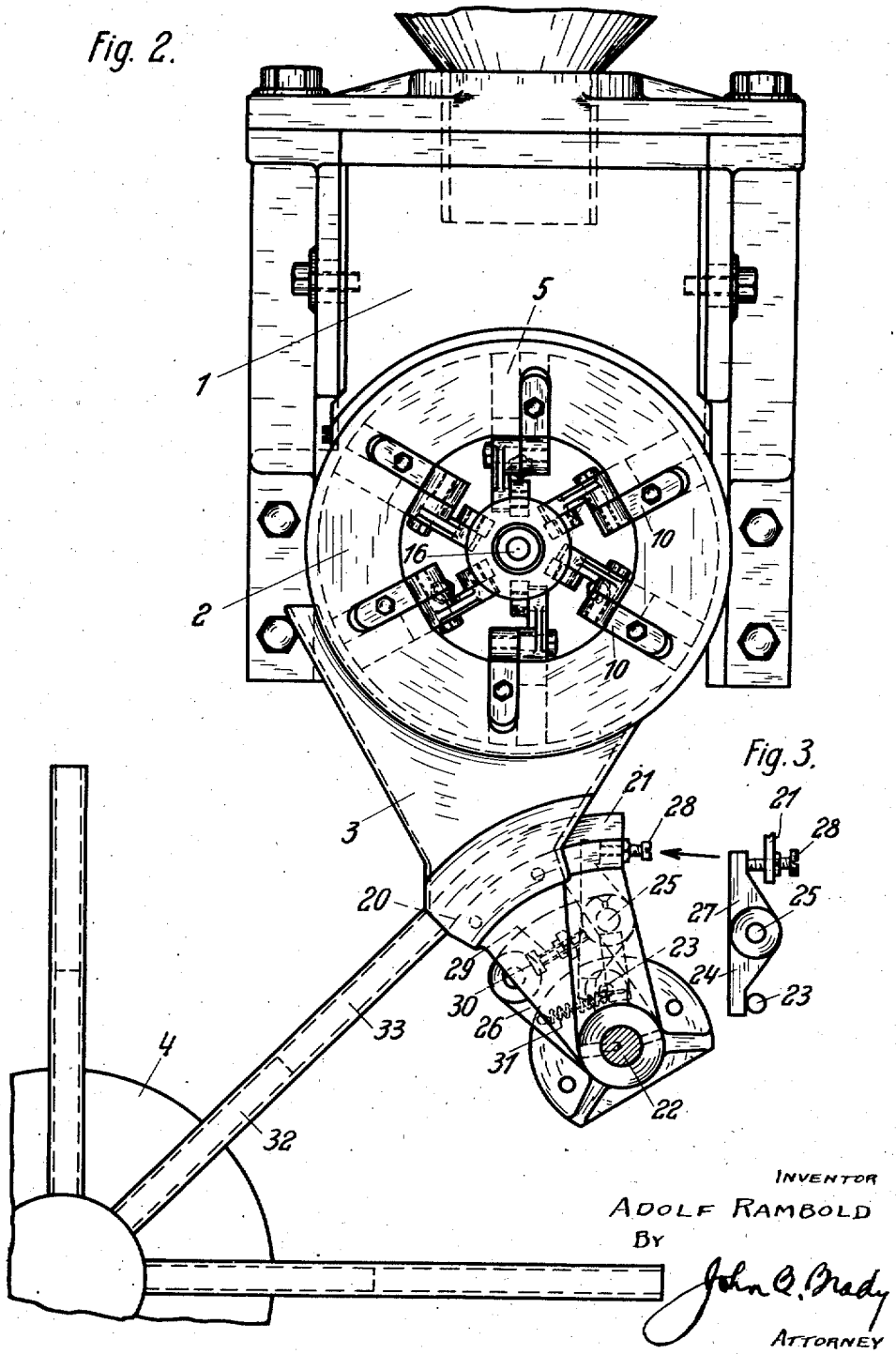
Fig. 2 is a front elevation of the filling hopper, the dosing device and the core wheel.
Fig. 3 shows a detail of Fig. 2.
Figure 17:
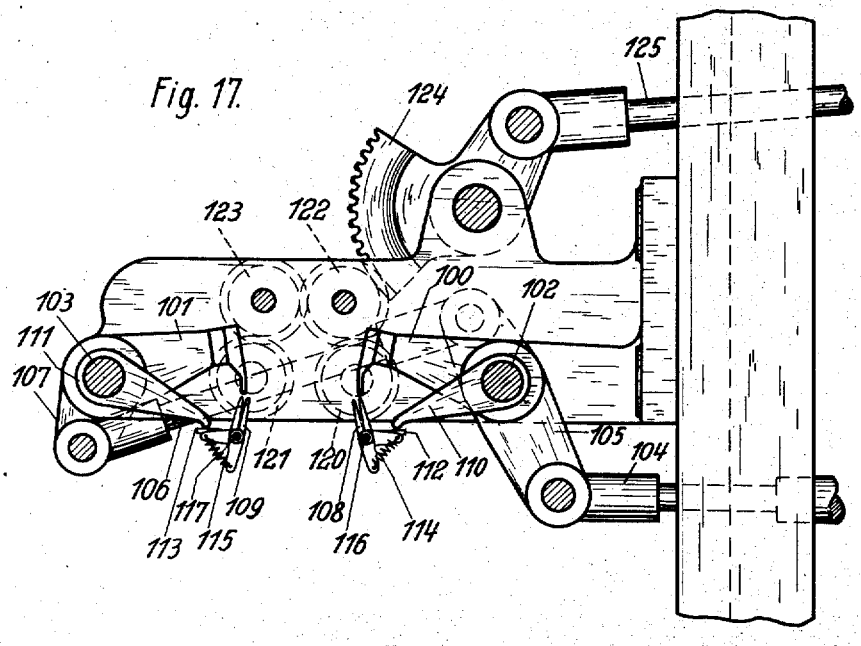

Fig. 17 is a side elevation and

Fig. 18 a plan view of the folding device.

Figure 19:
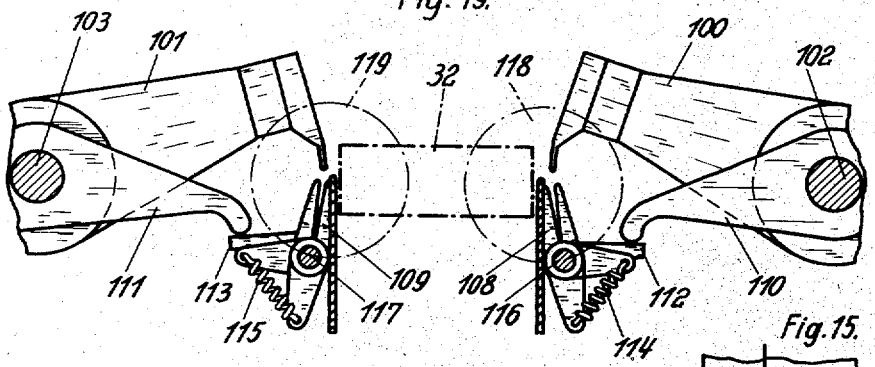

Fig. 19 shows on a larger scale the tongs for gripping the paper and the folding rails.

Fig. 20 is a plan view of the tongs, while

Figure 22:
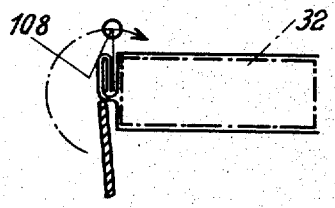
Figure 21:
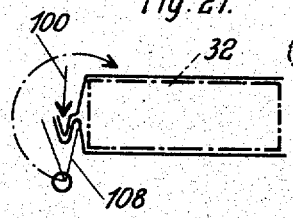

Figs. 21 and 22 are diagrams illustrating the action.

Figure 24:
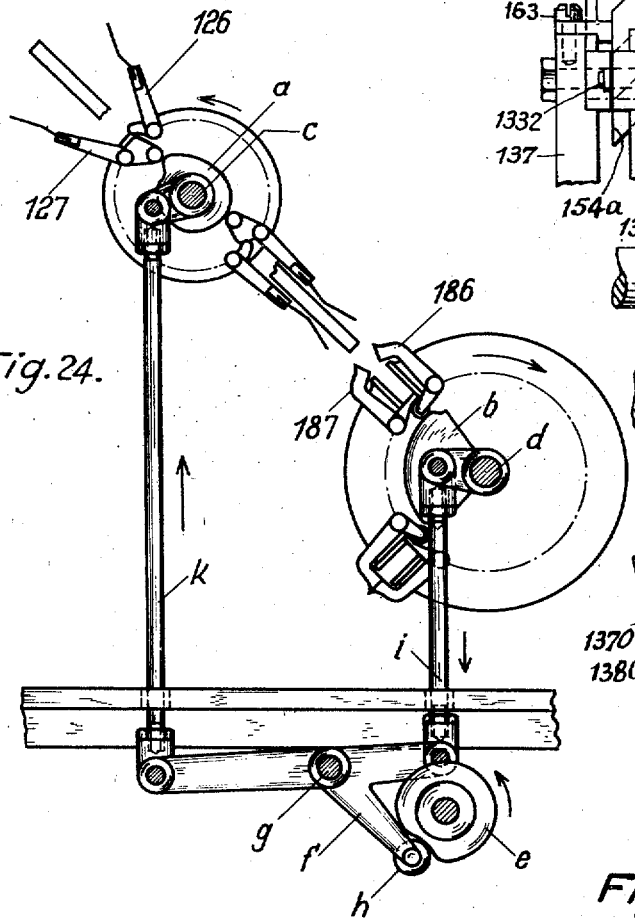

Fig. 23 is a front view of the core wheel and the clamp wheel with its gripping elements, while Fig. 24 shows the common drive for the gripping elements of the clamp wheel and of the core wheel.

Fig. 25 shows a detail of the plates of the core wheel.

Station D is the side seam stapling station and is illustrated in detail in Figs. 26 to 37.

Figure 26:
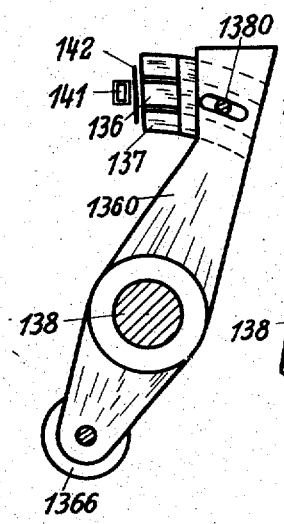
Figure 27:
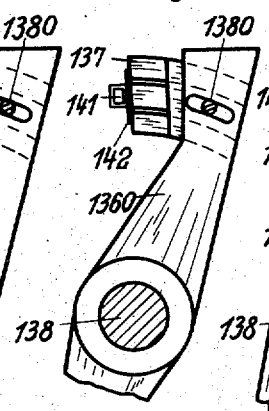
Figure 28:
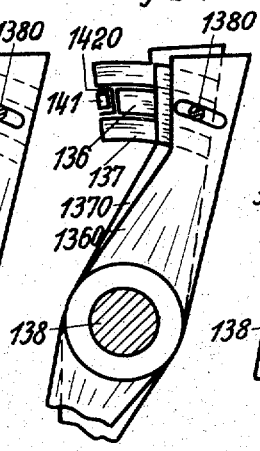
Figure 29:
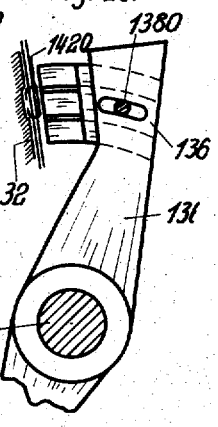

Fig. 26 shows the longitudinal steam stapling device prior to the severing of the staple wire, Fig. 27 after severing the wire, Fig. 28 after the bending and Fig. 29 after the stapling.

Figure 31:
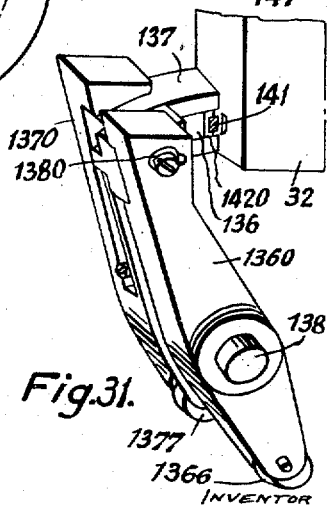

Figs. 30 and 31 show in perspective the device diagrammatically illustrated in Figs. 26 to 29, Fig. 30 prior to cutting and Fig. 31 after the cutting and bending of the staple.

Fig. 32 is a front elevation of the device shown in Figs. 26 to 31 and of the sheet metal strip feed.

Figs. 33 to 36 show the wire feed.

Figure 33:
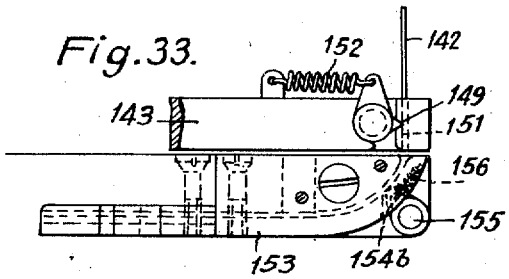

Fig. 33 shows part of the gripper for the wire feed with the magazine.

Figure 34:
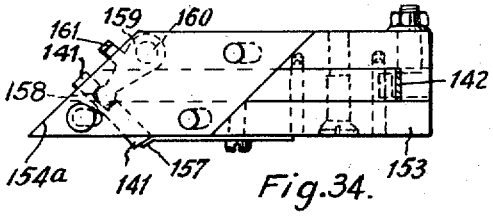

Fig. 34 is plan view of the magazine.

Figure 35:
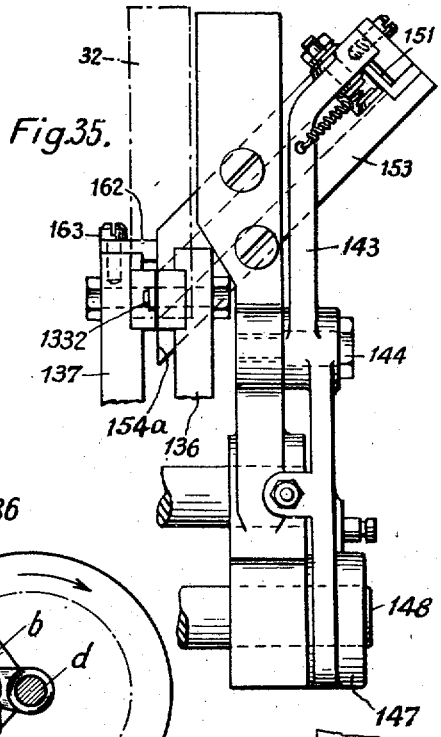

Fig. 35 is a front elevation of the wire feed and

Figure 36:
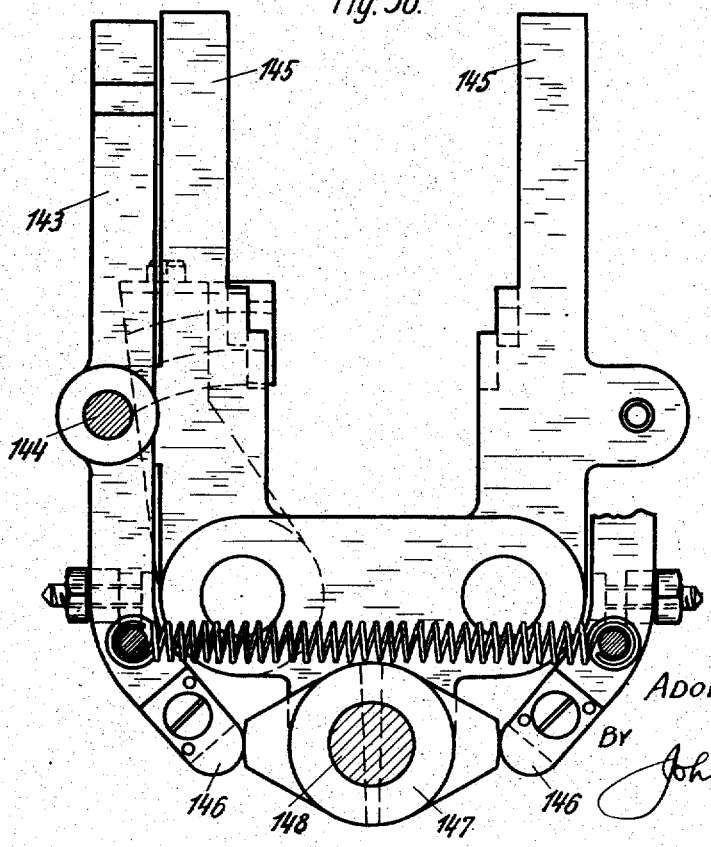

Fig. 36 is a side elevation of same, the magazine being omitted.

Figure 37:
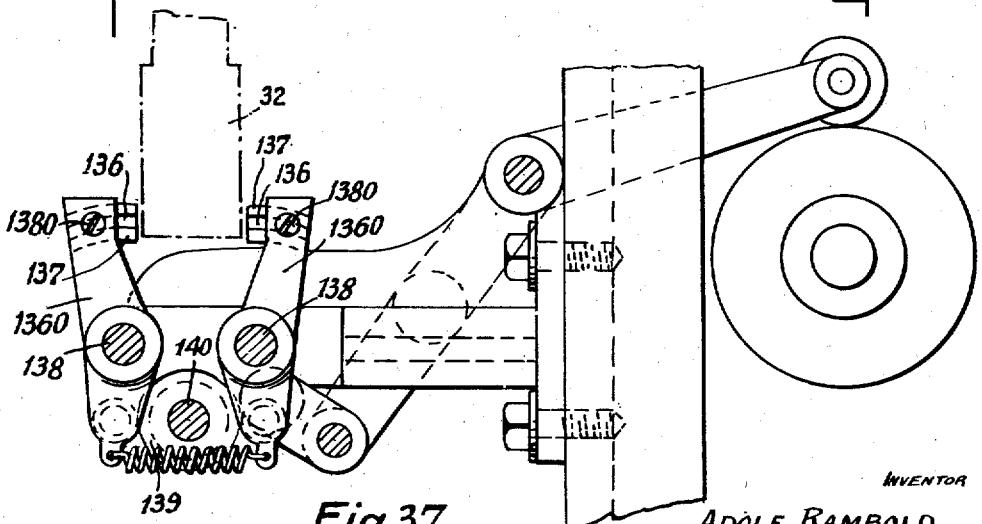
Figure 53:
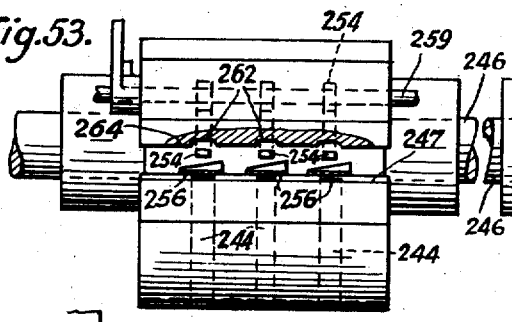
Figure 54:
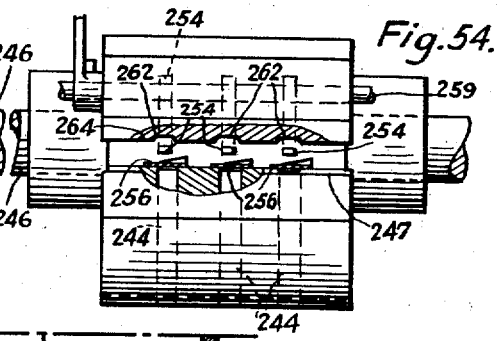

Fig. 37 illustrates the construction of the side fold stapling device in side elevation.

Station E is the stripping station and is illustrated in detail in Figs. 38 to 43.

Figure 38:
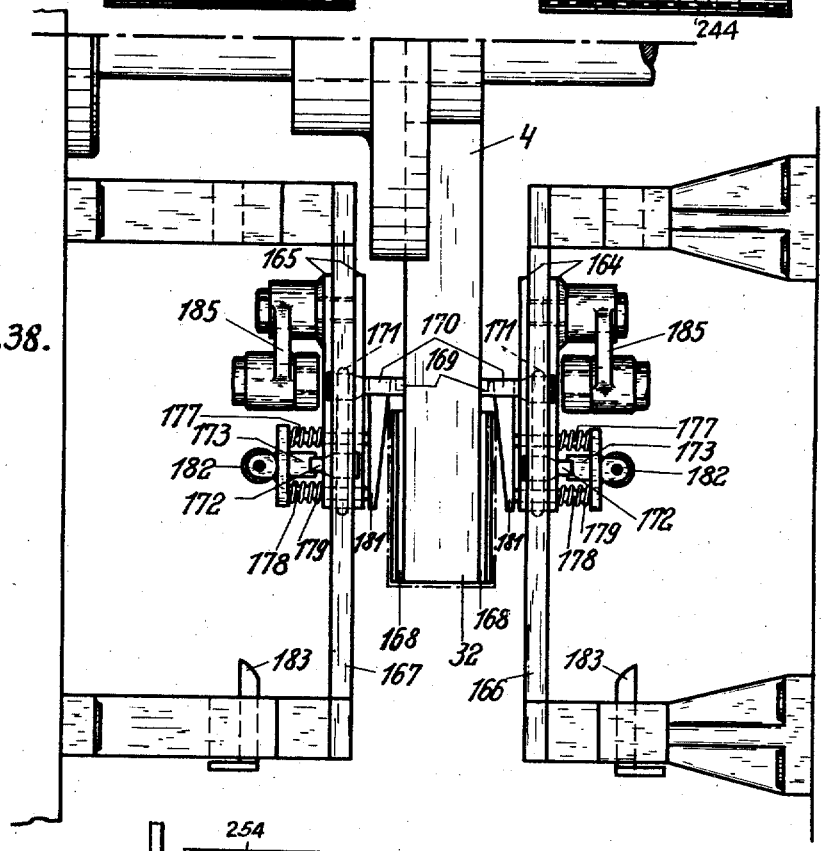
Figure 55:
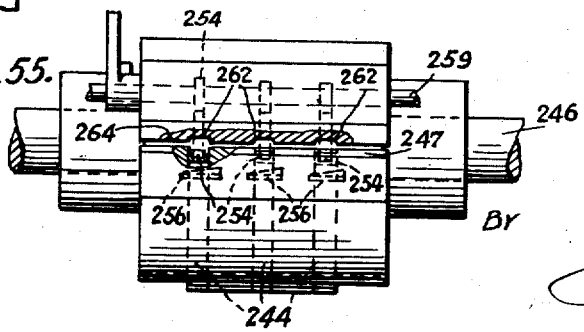

Fig. 38 is a side elevation of the stripping device.

Fig. 39 is a front elevation of the device in the form of two slides.

Fig. 40 is a sectional view of one of the slides.

Figure 41:
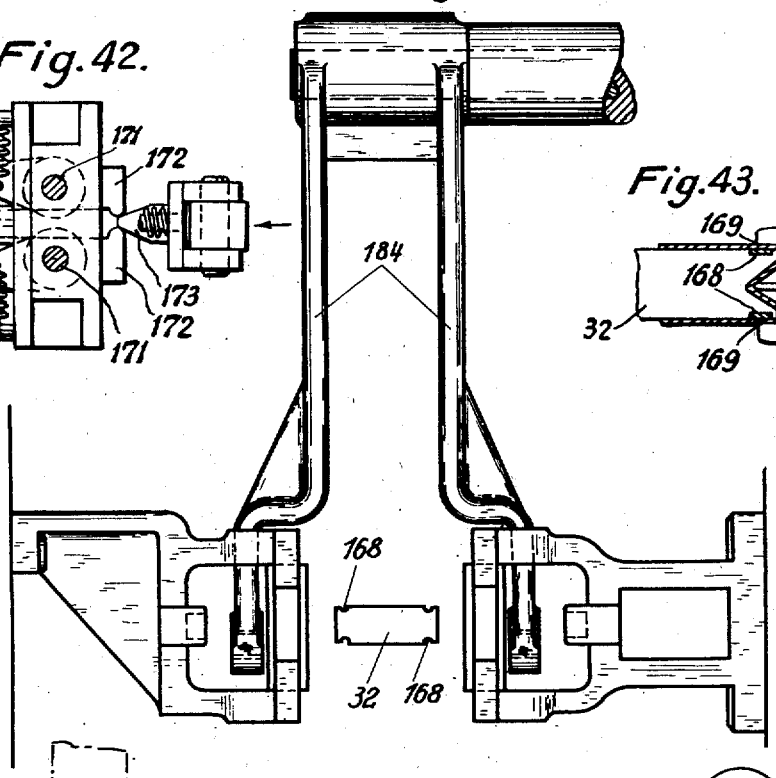

Fig. 41 shows the driving fork for the slides.

Figure 42:
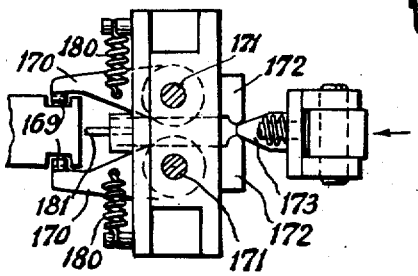

Fig. 42 is a plan view of one of the slides.

Figure 43:
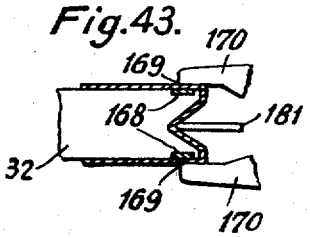

Fig. 43 is a diagram illustrating the stripping action.

Figure 45:
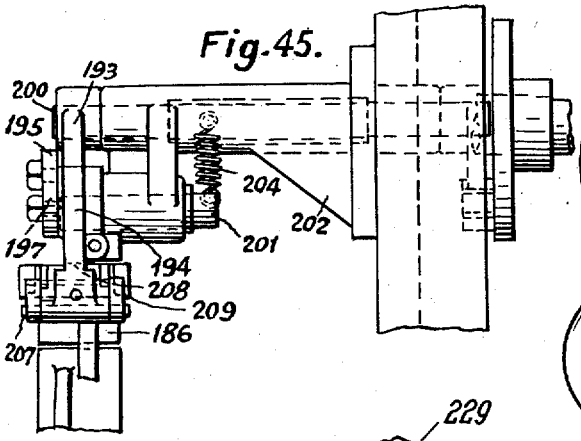

Station F is the bag mouth folding station and is illustrated in detail in Figs. 44 and 45.

Fig. 44 is a front elevation and

Fig. 45 is a side elevation of the mouth folding device.

Station G includes devices for pressing flat and stapling the mouth sealing fold, the pressing device being illustrated in detail in Figs. 46 to 48 and the stapling device in Figs. 49 to 56.

Fig. 46 is a front elevation of the device for pressing flat the mouth sealing fold.

Fig. 47 is a side elevation and

Fig. 48 is a detail of same.

Fig. 49 is a side elevation of the treble head sealing fold stapling device, partly in section, prior to the beginning of the stapling, while Fig. 50 shows the apparatus after the severing of the wire and bending of same.

Fig. 51 shows the device illustrated in Figs. 49 and 50 seen from above in the direction of the arrow, while Fig. 52 is a plan view, on a smaller scale, of the rocking lever of the stapling and bending plunger.

Figs. 53 to 56 show the head of the triple stapling device in front elevation in the stages of operation corresponding to those illustrated in Figs. 26 to 29.

Figure 57:
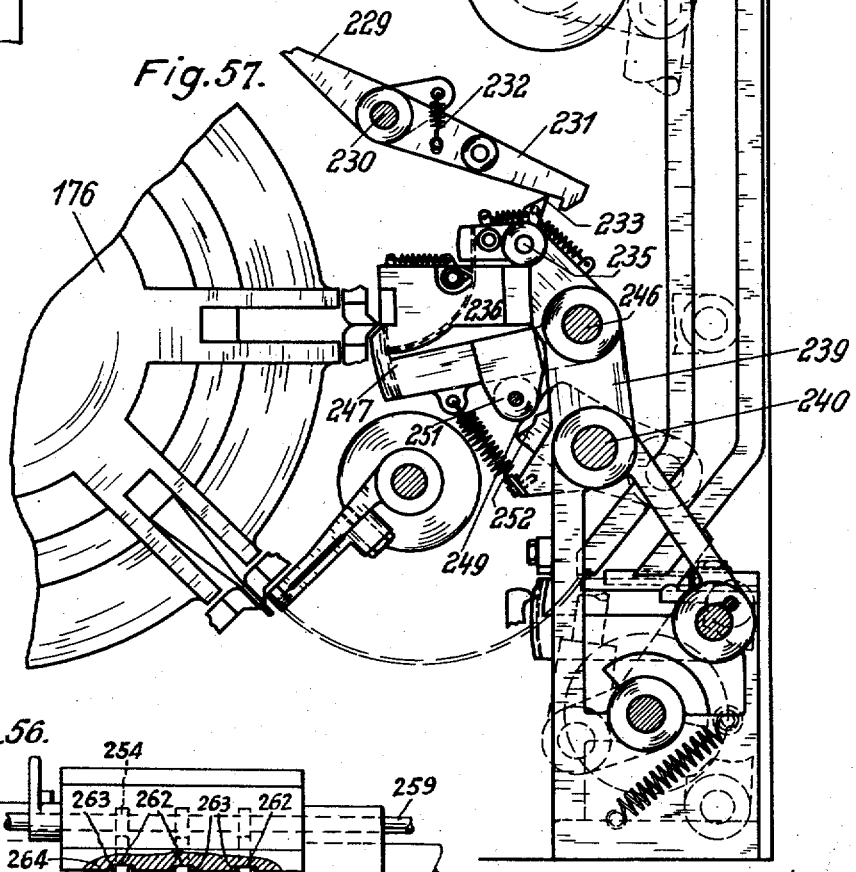
Figure 56:
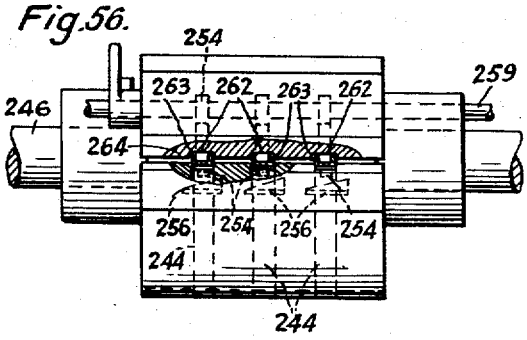

Station H is the label fixing station and is illustrated in detail in Figs. 57 and 58.

Fig. 57 is a general front elevation of the triple head sealing fold stapling device, the holder string feed and the label pile, while Fig. 58 diagrammatically illustrates the fastening of the label string and of the label on the bag.

Stations J and K include the devices for forming the outer covering or wrapping of the bag and are illustrated in detail in Figs. 59 to 66.

Fig. 59 is a general diagrammatic view showing the operation of the device.

Figure 60:
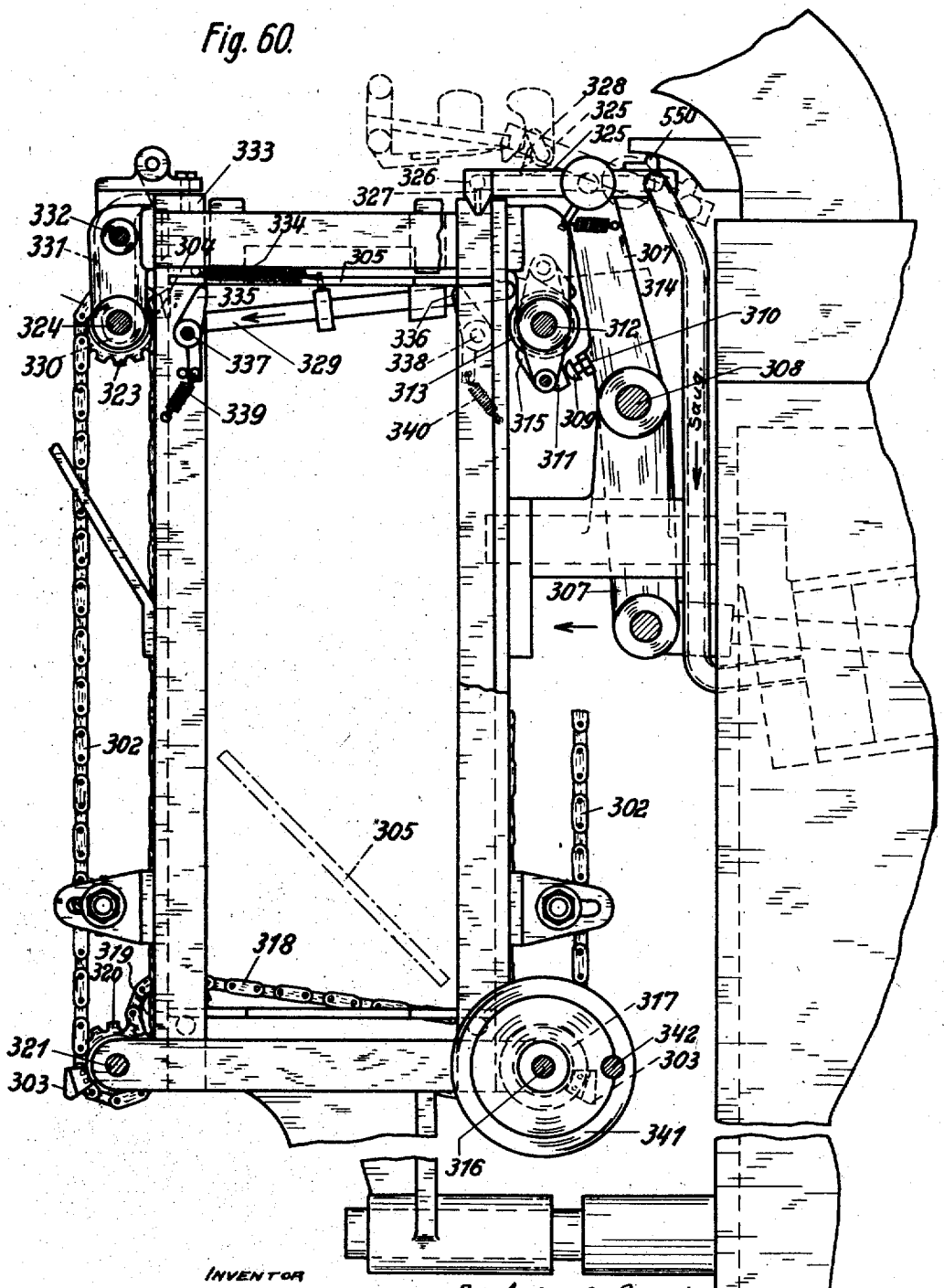

Fig. 60 is a side elevation of the wrapping blank holding means.

Figure 61:
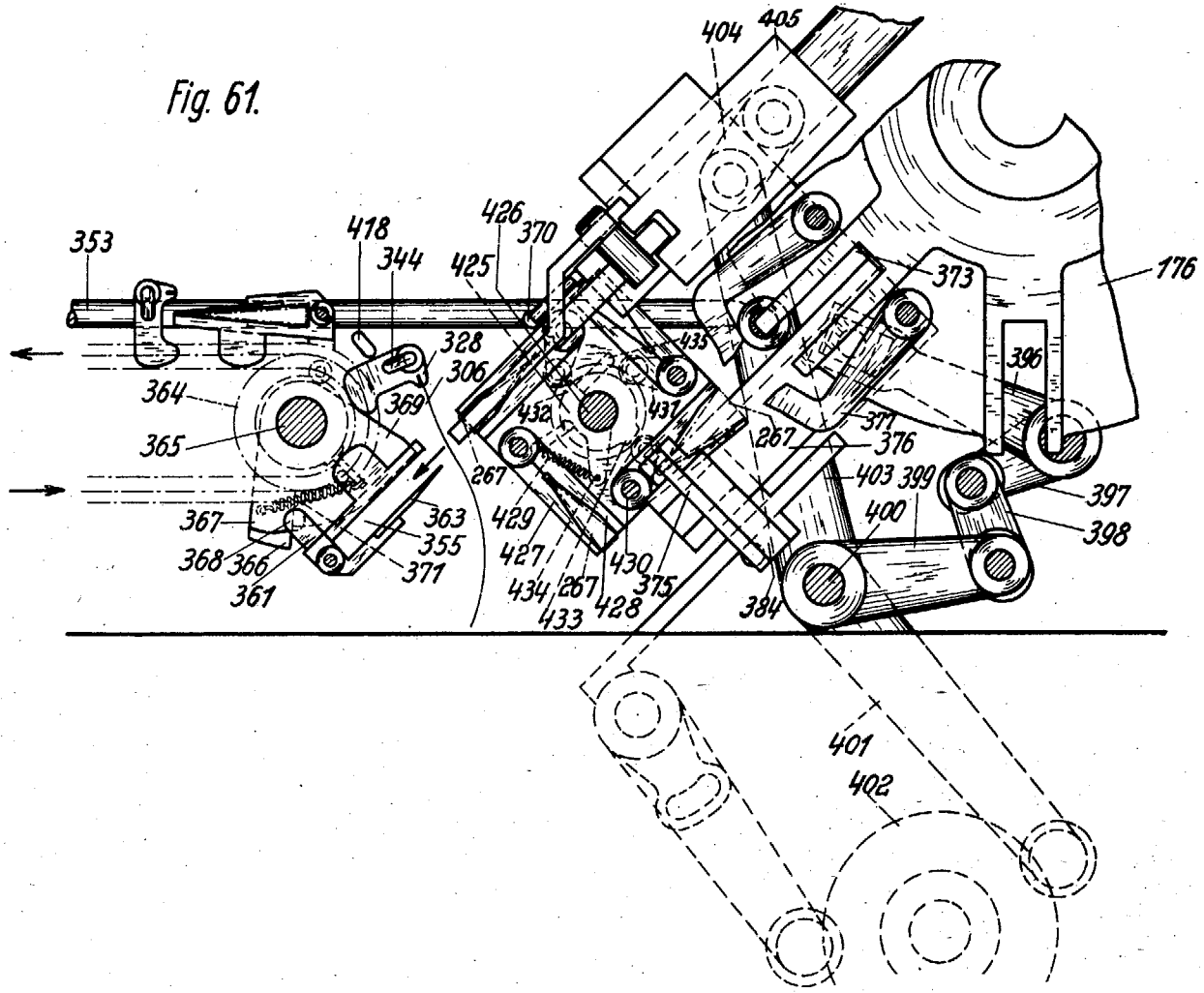

Fig. 61 shows the feed of the bags to be wrapped to the conveyor band of the wrapping device.

Figs. 62 to 65 are details of Fig. 61.

Figure 62:
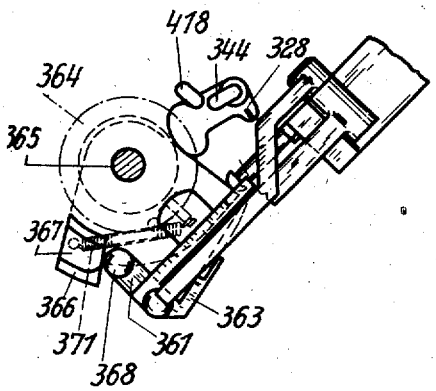

Fig. 62 shows the pusher member, which is illustrated in Fig. 61 in its upper position, in its lower position after same has introduced the bag into the gripping pocket of the conveyor band.

Figure 63:
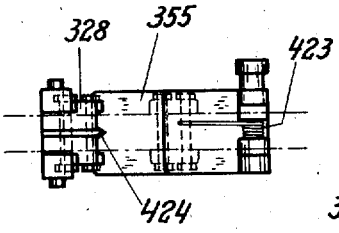

Fig. 63 is a plan view of a gripping pocket and of a pair of wrapping sheet tongs of the conveyor chain, as may be seen in side elevation in Fig. 61.

Figure 64:
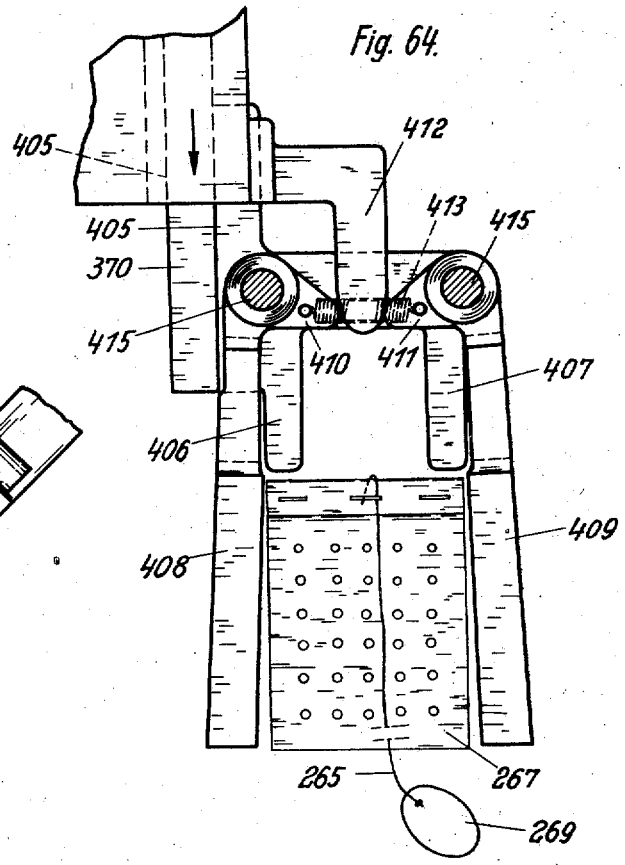
Figure 65:
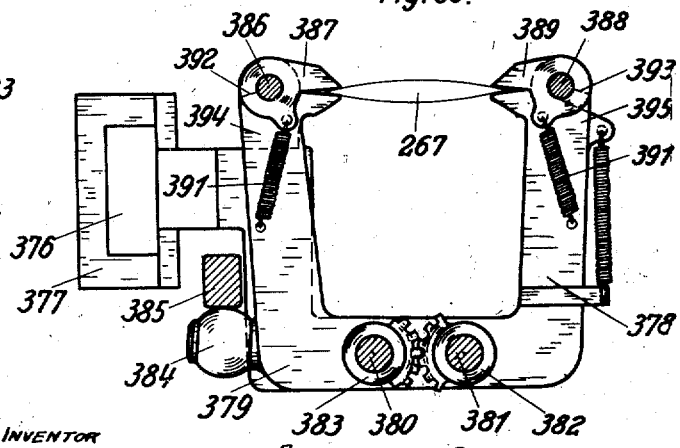

Fig. 64 is a front elevation on an enlarged scale of the pusher member for the bag and of lateral clamping members therefor, while Fig. 65 is a plan view of grippers having for their object to seize the bag at its head on both sides and convey it from the clamp wheel into the holder tongs of the reversing wheel and to guide the bag.

Fig. 66 shows the delivery station for the wrapped bags with the crimping device for sealing the wrapper disposed in front of same.

*Station A*

1 indicates the container for the substance to be filled into the bags, 2 the dosing drum, 3 the filling hopper and 4 the core wheel. The dosing drum 2 is provided with measuring chambers 5 the capacity of which is controlled by plungers 6 guided in the chambers 5. The adjustment of the plungers is effected by means of a lever system 7 and 8. The arm 7 of the system is pivoted to the plunger 6 as well as to the arm 8, while the arm 8 is pivotally mounted with the aid of a pin 9 in a block 10.

Secured to the pin 9 there is a fork 11 which engages a pin 12 fixed in an arm 13 extending from a ring 14 loosely mounted on a nut 15.

The nut 15 is screwed on the threaded free end of the shaft 16 of the dosing drum 2 and is secured in adjusted position by a lock nut 17.

A coupling shaft 18 carrying at its end an operating knob 19 is guided through the hollow shaft 16 and serves for the engagement and disengagement of the dosing drum.

On the bottom 20 of the filling hopper 3 is guided a swivelling filling plunger 21 which is fixed to a shaft 22, while the filling hopper 3 has its bottom member 20 loosely mounted on the shaft 22.

On the member 20 is seated a bolt 23 against which the arm 24 of a two armed lever mounted on the pin 25 of a bearing bracket 26 is adapted to strike. The other arm 27 of this striking lever is supported by an adjusting screw 28 carried by the plunger 21. The member 20 is further provided with an adjusting screw 29 which is applied to a stop 30 of the bracket 26 under the action of a spring 31. This adjusting screw 29 regulates the spacing of the filling hopper 3 relative to the hollow core 32 of the core wheel 4, while the screw 28, when it strikes against the arm 27 of the striking lever, causes the arm 24 to remove the filling hopper from the core 32 of the core wheel 4 with the aid of the bolt 23, so that when the plunger has filled the substance into the filling space 33 of the core 32 the core wheel may freely pass. Even in its foremost position the plunger 21 is slightly spaced from the core 32.

Owing to the provision of the filling plunger 21 it is possible for the substance (e. g. tea) to be stored in readiness for the next hollow core 32 on the filling plunger 21, whereby a considerable amount of time is saved, since the material has already completed its passage from the dosing chamber 5 to the filling plunger 21 by the time the hollow core 32 to be filled arrives at this station. This enables the rotational speed to be increased.

*Station B (Figs. 5 to 11)*

The core wheel 4 with the filled core 32 is now moved forward and brought before the bag paper feed device which includes positively driven rollers 34 and 35.

The roller 35 is rockably mounted, so that when the required length of paper has been fed in, the feed device is positively lifted only to such an extent that no further feeding of paper is effected.

A brake roller 36 is provided, which is stopped by a brake 37 according to rhythm of operation.

Cutting the blank and pre-folding are further tasks of this station, i. e. the paper provided for the bag is severed in adjustable lengths and is pre-folded with the aid of folding plates around the core 32. The pre-folded bag sheet is then held on to the core by grippers mounted on the core wheel. 38 indicates a slide which is driven by a lever 39. The slide is guided on a slideway 40 (Fig. 6), which is connected by screws 41 to the frame of the machine. The pre-folding plates 42 and 43, which are guided on a guide rail 44, are secured to the slide 38. Between them a plunger 45 is resiliently mounted, the plunger rod 46 of which is passed through the bore of a yoke 47. The web of paper is advanced by the rollers 34, 35 between two guide plates 48 and 49. On the folding plates 42 and 43 of the slide 38 paper supporting angles 50, 51, 52 and 53 are provided, the opposed edges of which are chamfered and the shoes 51 and 53 of which are located somewhat lower down (Fig. 5) to support the overhanging paper. 54 indicates the paper supporting plate which has an adjustable stop 55.

On the paper supporting angles 50 and 51 (Fig. 8) clips rockable on pins 56 are provided, which are pressed by springs 58 to the angles 50 or 51. These clips have for their object to press the paper which has run up with play on the paper supporting angles on to the side walls of the angles 52 and 53 and to smooth it out in this manner when the folding plates 42 and 43 are actuated by the lever 39 and, running along the core 32, fold the paper about same, the plunger 45 holding the bottom of the bag being formed resiliently on to the core 32. In the upper position of the slide 38 the clips 57 are lifted off the angles by a cam 59 against the action of springs 58, so that the feed of the paper is not obstructed. The cam 59 is secured to a cross bar 60.

As shown in Fig. 6, the members 50 to 53 are secured by screws to the folding plates 42 and 43. They may, however, be rockably disposed on the folding plates, as shown in Fig. 9, the pin 61 acting as pivot.

These rockable paper supporting plates also act as smoothing means for the paper supplied, provided the pivot point is suitably disposed.

It is important that by this arrangement the paper supplied into the machine may have a considerable play, and yet the incoming paper is brought into the desired position by the suitable arrangement of the pivot point, i. e. two operations are performed with one movement.

A spring 62 holds a roller 63 of the member 51 in the horizontal position thereof against a stop 64, which extends from the cross bar 60.

The operation of the paper supporting angles is as follows:—

When the slide 38 descends the roller 63 of the member 51 pivoted to the folding plates recedes from its stop 64, so that the spring 62 becomes operative and rocks the member 51 around the pin 61 through 90° up to the stop 64. The other paper supporting angles 50, 52 and 53 are disposed in like manner.

A knife 65 for severing the web of paper cooperates with a knife 66. The head of the knife 66 is rockable around a vertical shaft 67 and is adjusted by means of an adjusting screw 68, being held against a stop 70 by a spring 69. The knife 66 is mounted with the aid of a bearing member 71 on a horizontal shaft 72. A rockable arm 73 is provided with a pusher roller 74, which is operated by a pusher 75 secured to the slide 38. A spring 760 pulls the lever 73 with the roller 74 against a stop 75, thereby bringing the knife into the initial position, the spring 760 rocking the arm 73 and therewith the bearing member 71 in such a manner that the knife 66 is raised.

On the core wheel 4 gripper means 126 and 127 are provided (Fig. 23), which are rockably mounted on pins 128 and 129. The grippers are held together by a spring 130. The gripper 127 is provided with a roller 131 controlled by a curve. In addition it has a cam 132 which cooperates with a cam 133 of the gripper 126 in such a manner that when pressure is applied to the roller 131 in the direction of the arrow the grippers open, firstly, when the folding plates 42 and 43 descend, and secondly, when the bag formed on the core 32 is stripped from same after filling and is to be introduced into the clamp wheel, as described later. The folding plates 43 and 42 descending on the core 32 have recesses 134 to enable them to receive the fingers 135 of the gripper which have to hold the pre-folded bag sheet on to the core.

The gripping means 126 and 127 of the core wheel, as well as the gripping means 186 and 187 of the clamp wheel 176 to be described later, are controlled by cam wheels *a* and *b* respectively, as will be seen in Fig. 24, said cam wheels being mounted on the respective shafts *c* and *d* of the wheels. The cams *a* and *b* are driven from a central cam *e* through a lever *f* mounted on the shaft *g* and comprising, for example, a three armed lever, at one end of which a roller *h* is provided which is applied to the cam *e*, while the other arms of the lever are connected to rods *i* and *k* forming the driving connection with the cams *b* and *a* respectively.

*Station C*

The edges of paper projecting beyond the narrow sides of the core 32 are folded together and pre-creased by the device now to be described.

This device comprises two gripper shears, the arms of which are indicated at 76, 77 and 78, 79 respectively. The arm 77 is secured to a shaft 80. A link 81 connects the shear arm 77 to the shear arm 76 with the aid of a pin 82 which is mounted in an adjusting slot 83. The arm 76 is rotatably mounted on the frame of the machine with the aid of a shaft 84. The rocking arm 78 is secured to a shaft 85, while the arm 79 is loosely mounted on a shaft 86. On the arm 79 is mounted a connecting link 87 which connects same to the lever 78 with the aid of a pin 88 mounted in an adjusting slot 89 of the arm 78. A lever arm 90 is provided for operating the shears 76, 77 and 78, 79, said lever arm actuating a two armed lever 91 secured to the shaft 80 and pivoting therewith. To the free end of the two armed lever 91 is pivoted a rod 92 the other end of which is pivoted to a lever 93 secured to the shaft 85 and adapted to rock therewith. The shears 76, 77 and 78, 79 have jaws 94, 95, 96, 97. The jaws are provided with ridges 98 and 99 and with corresponding grooves for precreasing the paper (Figs. 17 to 22).

Figure 15:
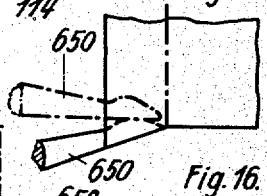
Figure 16:
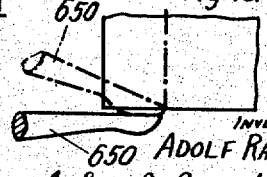

As will be seen from Figs. 15 and 16, a finger 650 is provided on each side for beating the bottom portions overhanging the base area of the core either between the projecting side walls to be folded on to the core, or bending them outwardly so as to form an outwardly projecting corner which is folded over upwardly and inwardly later on. Thus, the fingers 650 bring the parts overhanging the bottom outwardly or inwardly into the desired position, in the following manner:

The fingers 650 form one arm of respective bell crank levers pivoted in bosses 651, 652 (Figs. 12 and 13) and subject to the action of springs 655, 656. The other arms 653 and 654 of the bell crank levers carry rollers at their ends and are jointly actuated by a presser plate 657 in opposition to the springs 655, 656. The fingers 650 are removed from the path of the jaws 94, 95, 96, 97 prior to these being closed by the action of the presser plate 657. When said jaws are opened the presser plate 657 releases the bell crank levers, so that, according to the arrangement of the presser plate relatively to the bell crank levers and according to the direction of pull of the springs 655, 656, the fingers 650 either beat the overhanging corners between the projecting side walls, i. e. downwardly (Figs. 16 and 16*a*) or bend them outwardly (upwardly, Figs. 15 and 15*a*), to be folded inwardly later on. The shape of the fingers 650 shown in Figs. 15*a* and 16*a* is due to the fact that they must clear the shears 76, 77 and 78, 79, as will be readily understood with reference to Fig. 12.

After this folding operation the core wheel is caused to move forward towards the second folding station. The core 32 with the pre-folded paper is brought thereby in front of rockable folding rails 100 and 101, which are secured to shafts 102 and 103 arranged to be rocked by a lever system 104, 105, 106 and 107. The object of these folding rails is to introduce the precreased paper into tongs 108 and 109, which are opened for this purpose by members 110 and 111 formed as cam levers or as cams when the arms 100 and 101 descend. Members 110 and 111 are secured to their respective shafts 102 and 103 and act upon arms 112 and 113 of the tongs against the action of springs 114 and 115. The tongs 108 and 109 are mounted on bolts 116 and 117 in such a manner that their jaws are level with the middle of the narrow sides of the core 32. The bolts 116 and 117 are eccentrically mounted on axles 118 and 119 having gear wheels 120 and 121 at their ends, which are in mesh with gear wheels 122 and 123 operated by a toothed segment 124 from a lever 125 in such a manner that the tongs are rotated through 180°. The result of this operation is that the projecting edges of the paper, which have been folded once by their introduction into the tongs 108 and 109, are turned over on to the narrow sides of the core, as shown in Figs. 21 and 22, and are beaten on to the core, so that the fold is completed and is applied on both sides to the core. If the length of the paper is such that part of it projects from the closed tongs, it is possible to produce a triple fold with this device at this point.

A double fold will suffice in most cases. This fold is held by plates applied to the core wheel on both sides on the way to the stapling station and at the same time is pressed into position.

*Station D*

At the next station the staples are produced and at the same time the side folds of the semi-finished bag produced as described are fixed by staples.

Two sets of plungers 136 and 137 guided one in the other and movable relatively to one another perform this task. The plungers 136 and 137 are mounted on two armed levers 1360 and 1370 and are loosely pivoted on a shaft 138. They are controlled by a cam disc 139 mounted on a shaft 140.

142 indicates the strip of sheet metal from which suitable pieces are cut off for forming the staples. 141 indicates the bending plunger over which the wire 142 must be bent for forming the staple 1420 and which is advanced and withdrawn in accordance with the rhythm of operation. One end of the rocking levers is provided with respective cam follower rollers 1366 and 1377, while at the other end of the lever 1360 the staple driver 136 and at the other end of the lever 1370 the staple former 137 is mounted by means of screws 1380 in a detachable and adjustable manner. The rocking lever 1370 also serves to remove the bending plunger 141 from the path of the staple driver 136. The movable members are held in their initial positions by springs.

A stapling unit 136, 137 is disposed on each side of the core 32. Figs. 26 to 32 diagrammatically illustrate the stapling process. The metal strip 142 supplied in the manner to be described hereinafter is stopped in its feed movement by an abutment 1332 (which is resiliently withdrawn when striking the anvil wall) and is severed by the plungers 136 and 137, inasmuch as these are rocked forwardly around the shaft 138 to the same extent so that their forward edges become flush, the driver 136 and the staple former 137 then forming a common cutting edge, while the other cutting edge is formed by the supporting wall of the feed magazine.

Between the bending plunger 141 and the wire 1420 to be cut off there is a distance corresponding to the thickness of the wire, said distance being filled up by the severed wire, as shown in Figs. 26 and 27. The staple driver 136 holds the piece of wire 1420 fixedly against the bending plunger 141, while the plunger 137, controlled by the cam 140, continues its rotation and forms the staple 1420 by bending around the bending plunger 141.

As soon as the U-shaped staple is formed the bending plunger 141 is removed from the path of the staple driver 136, which swings forward and performs the stapling as shown in Fig. 29.

The anvil is always on the core 32 around which the paper has been folded into a bag.

The strip required for the stapling is supplied by the device illustrated in Figs. 33 to 36.

The metal strip 142 is fed forward by a two armed lever 143 which is formed as a strip clamp. The lever 143 is mounted on a journal 144 disposed on a beam 145 of the frame. The lever 143 has a nose 146 at its lower end which is controlled by a cam 147 mounted on a shaft 148.

On the lever 143 there is a locking projection 149 which is rockable around a pivot 150 thereon.

In order to be able to produce a clamping action the distance apart of the projection 149 from the axis of rotation is slightly larger than that of the staple strip 142, which is applied against the guide path 151 of the lever 143. The point of attack is located below the axis of rotation, so that the feeding of the strip may be effected in the following manner:—

When the lever 143 is withdrawn the projection 149 moves springily downwards. When the lever 143 moves forward the projection 149 is pressed towards the axial plane of its axis of rotation and thereby the metal strip 142 is fed forward by friction to the desired extent.

The projection 149 is pressed to the metal strip 142 by a spring 152. The metal strip 142 then moves, guided in a magazine 153, up to the cutting edge 154a formed at the end thereof. The cutting edge is not perpendicular but inclined to the longitudinal edge of the metal strip, so that the ends of the severed staples are pointed.

In order to prevent the reverse movement of the metal strip a clamping device, similar to that provided on the lever 143, is mounted in the magazine 153. This clamping device comprises a locking projection 154b mounted on a pivot 155 and held by a spring 156, and operates in opposition to the member 149.

Furthermore, the aforesaid bending plunger 141 is guided in the magazine. A leaf spring 157 holds the bending plunger 141 in its forward operative position.

The bending plunger 141 is provided with a recess 158 in which engages a control lever 159 mounted on a pivot 160 of the member 153. The control lever 159 has a projection 161 controlled by a cam 162 detachably secured to the plunger 137 by a screw 163 and adapted to become operative when the bending operation is completed. In the manner as the plungers 136, 137 are disposed at each narrow side of the core 32, the corresponding feed devices for the strip are disposed one on each side. As in the case of the plungers, the levers 143 are held on to their cam by springs.

*Station E (Figs. 38 to 43)*

After the bag so formed has been stapled the core wheel 4 arrives in front of a stripping device, at the level of which the grippers 126, 127 are positively opened. The stripping device comprises two slides 164 and 165 which are guided in rails 166 and 167. The elements necessary for the stripping are disposed on the slides. In the edges of the broad sides of the hollow core 32 four longitudinal grooves 168 are provided, so that there is plenty of room for the stripping blades 169 to engage between the bag and the core 32. These blades are formed of blade springs mounted on rocking levers 170 seated at the upper ends of shafts 171. At the lower ends of the shafts 171 are disposed levers 172 which are operated by cams 173 when the bag is stripped from the core 32 and has been introduced between guide walls 174 and 175 of a clamp wheel 176. By this means the levers 170 are caused to approach one another and the bag is squeezed at its upper end.

Owing to the fact that the levers 170 perform a circular movement and their forward ends meet at the middle of the narrow sides of the bag, slightly outside of the level of the broad sides of the bag, a folding rail 181 simultaneously bending the narrow sides of the bag inwards, the desired width of the bag remains maintained. The cams 173 are guided in the slides 164 and 165 respectively by means of guide rods 177 and 178. Springs 179 hold the cams in their initial position and springs 180 are provided to hold the levers 170 in their initial posiiton. The guide rods 177 and 178 pass through the slides. On their inner ends are provided the folding rails 181, which fold the bag on its narrow longitudinal sides inwardly at the middle and must be supported by the members 170 during their operation in such a manner that these guide the paper, which is pulled inwards by the folding rails 181, from the outside, so as to cause a distinct, uniform fold to be made.

The resilient cams 173 which, as mentioned above, are connected to the folding rails 181 by guide rods 177 and 178 respectively, have rollers 182 at their rearward extension, which are operated by cams 183 when the slides move downwards. The slides are operated by a forked lever 184, to which the slides are pivotally attached by levers 185.

The upper edge of the bag drawn together by the arms 170 is gripped by clamps 186 and 187, which are mounted on the clamp wheel at 188 and 189. The distance apart of the clamps may be controlled by means of adjusting screws 190. The clamps are opened by a cam controlled roller 191 of the clamp 186, which acts upon the arm 192 of the clamp 187 during movement in the direction of the arrow.

*Station F*

The clamp wheel 176 conveys the bag in front of the mouth folding device (Figs. 44 and 45). The folding device comprises folding levers 193 and 194. These are operatively connected together by a hinge 195. The hinge 195 has an adjusting slot 196 and a guide slot 199. In the slot 196 is guided the bolt 198 of the lever 193, while the bolt 197 of the lever 194 is guided in the slot 199. The lever 193 is fixedly mounted on a shaft 200 which is provided for actuating said lever. The lever 194 is secured to a bolt 201 which, like the shaft 200, is mounted in a bearing bracket 202. At the other end of the bolt 201 a spring holder 203 is fixed, and the lever 194 is indirectly connected by a spring 204 to the lever 193, the ends of the spring being connected to the lever 193 and the holder 203 respectively. The spring 204 has the tendency of pulling the lower ends of the levers 193 and 194 towards one another. The free end of the lever 193 is provided with a folding bar 205, while a pressing jaw 206 is pivoted at 207 to the end of the lever 194. The jaw 206 is operated by a cam 208 disposed on the lever 193, said cam acting upon a roller 209 of the jaw 206. The jaw 206 is pressed against a presser plate 210 of the lever 194. Normally, a spring 211 holds the jaw 206 apart from the plate 210.

The operation of the device is such that when the shaft 200 turns in anticlockwise direction the upper edge of the bag projecting from the edge of the clamp wheel 176 is folded by the folding bar 205 and is introduced between the folding jaw 206 and the plate 210. The lever on which the folding bar 205 is disposed operates twice. During the automatic return after folding the cam 208 acts upon the roller 209 and the jaw 206 is pressed against the plate 210. Pressing is effected only after the folding bar 205 has been withdrawn from the range of the jaw 206 and the plate 210. This is made possible by the fact that the guide slot 199 is so made that there is lost motion prior to the lever 193 being able to operate the lever 194 through the hinge 195.

*Station G*

After this operation and due to further rotation of the clamp wheel 176 the bag arrives in the range of the mouth closure flat pressing and pre-perforating device, which simultaneously effects pre-perforation of the mouth closure for the reception of the staples.

This device comprises the presser levers 212 and 213, which are also connected together by a link 214. The link 214 is mounted on the lever 212 on a journal 215 thereof, while the hinge is clamped fast with the lever 213 by means of a bolt 217 passing through its slot 216.

The lever 212 is secured to a shaft 218 which operates the device. The lever 213 is mounted, in the same manner as the lever 194, on a journal 219. The shaft 218 and the journal 219 are mounted in a bearing bracket 220. A spring 221, one end of which is secured to the lever 212, is connected to a spring holder 222 fixed to the journal of the lever 213, so that the spring pulls the lower ends of the levers 212 and 213 towards one another. The lower end of the lever 212 is provided with passage holes 223 for needles 224 secured to the lever 213.

A spring plate 225 has holes 226 and 227 indicates a presser plate. The folded upper edge of the bag projecting from the gripper of the clamp wheel is introduced between the pressure plate 227 and the spring plate 225, and between these it is pressed flat and pre-perforated. The spring plate 225 has for its object to strip the perforated bag edge from the needles 224.

After this operation the bag 267 is stapled and if same is an infusion bag a holder string 265 with label is simultaneously attached thereto.

As shown in Fig. 47, the mouth-fold-flat-pressing device has a slot 228 in which engages a feeler 229. The feeler controls the forward feed of the metal strip in such a manner that the feed is cut out when the machine idles, and it operates in such a way that it feels the bag passing through the mouth-fold-flat-pressing device, and when a bag is missed it automatically cuts out the feed of the following stapling device. The feeler is mounted on a shaft 230 in the frame and has a nose 231 at its end remote from the mouth-fold-flat-pressing device, said nose being normally held in elevated position by a spring 232, while the feeler 229 extends downwardly. The upper edge of a bag rocks the feeler 229 upwardly, thereby bringing the nose 231 level with a nose 233 which is connected to the gripping and feed member 234 of the mouth-fold-stapling device.

The metal strip feed member 234 is mounted on a shaft 235 (Fig. 57) in a bearing bracket 239, on which a metal strip guide 236 is fixedly carried. A staple driver 244, 245 and a staple former 247, 248 are mounted on a shaft 246, which is rockable on the arms of a bearing bracket 239 around a shaft 240 and guided straight, the forward movement causing the label string 265 to be placed in loop form around the head of the bag 267, as shown in Fig. 58 and as will be described later, and the rearward movement clearing the way for the further movement of the clamp wheel 176.

The device shown in Figs. 49 and 50 includes the staple driver 244 which is mounted on an arm 245 loose on the shaft 246. The staple former is indicated at 247 and embraces the driver 244. The former 247 is disposed on a fork shaped rocking lever 248, in the middle of which the arm 245 is disposed. The rocking lever 248 has two pivot points and is loose on the shaft 246, as is the shaft 245. The lever 248 is actuated through a roller 251 by a cam 249 secured to a driving shaft 250, while the arm 245 is actuated by a cam disc 252 and roller 253, said cam disc being also fast on the shaft 250.

254 indicates the staple bending plunger, which is rockably mounted in the frame of the metal strip feed device 255.

In Figs. 49 and 50 the metal strip is indicated at 256. The bending plunger 254 is resiliently held in its position of rest and is rocked from same by a cam 257 disposed on the lever 248 and acting on a nose 258 provided on a lever 260 fast on the pivot pin 259 of the bending plunger 254. A resiliently mounted abutment 261, Fig. 49, serves as a stop for limiting the feed movement of the metal strip 256, and also for guiding the severed wire during the stapling operation. The anvil for forming the staple is indicated at 262. The bent staple is indicated at 263 and the front face of the anvil at 264.

The operation of the device is as follows:—

The metal strip 256 is fed forward, the amount of feed being limited by the member 261. The levers 245 and 248 go forward together, the front edges of the bending and driving plungers become flush, the wire for a staple is severed from the metal strip 256 and moves up to the bending plunger 254 which barricades its way. The control cam 249 is so formed that the lever 248 moves the bending plunger 247 further forward, whereby the wire is bent and the staple 263 formed. The driver 244 is visible because one arm 248 and therewith one half of the staple former 247 is cut away.

When the bending is completed the cam exerts pressure by further movement of the lever 248 on the nose 258 of the lever 260 and thereby withdraws the bending plunger 254 from the path of the staple driver. The abutment 261 resiliently yields when it strikes the wall of the anvil 264.

The layers to be connected together by stapling lie on the wall 264. After the bending plunger 254 has been removed from the path of the staple driver 244 this moves forward controlled by the cam 252 and performs the stapling. The stapling members return into their initial position under spring action. When the stapling is completed the stapling unit is rocked back around the shaft 240 to clear the way for the bag 267.

*Station H*

As will be seen in Fig. 58, the label string 265 is brought in front of the head of the bag 267, guided by a string guiding eye 266, and is laid by the stapling device 236, 247, 248 at the forward movement of same in loop form around the head of the bag and is thus doubly stapled to the bag by a staple 263.

As the clamp wheel 176 continues its rotation the string 265 is pulled away with the bag until it arrives in front of a string gripping member 268 made in the form of shears. This member severs the string and at the same time swings into the position shown in chain dotted lines, where a label 269 is fixed on the string by means of a stapling device 270, which is similar to that described above. The labels are taken from a label pile casing 271, the lower part of which is offset with reference to the longitudinal axis in order that the whole weight of the pile of labels shall not rest upon the lowermost label.

In the path of the string 265 fingers 272 are disposed over which the string may be guided in order that the length which is determined by the distance apart of the stapling device 236, 247 and the string gripping shears 268 may be varied. The labels are drawn from the pile by a shouldered plate 273.

The labels are pushed forward by the shouldered plate 273 from the pile 271 to half their length only and are brought under the anvil of the stapling device 270.

After the label has been stapled to the string 265 it is pulled out of the pile by the forward movement of the clamp wheel 176.

*Stations J and K*

Here the protective wrapping is applied to the bag. 301 (Figs. 59 and 60) indicates the pile of wrapping sheets, the characteristic feature of which is that it may be replenished without interrupting the operation of the machine; also the sheets are taken from the top.

On both sides of the pile are disposed chains 302 each of which has two noses 303 and 304, these noses supporting a bottom plate 305 on which the pile 306 rests.

The upper part of the chain 302 shown on the right is omitted in order that the drive of the chains may be clearly seen.

The conveyor chains 302 are driven from a two armed lever 307 mounted on a shaft 308 and provided with a pusher 309, fitted into a boss 310 of the lever 307. The pusher 309 is in driving engagement with a two armed pawl 311 fast on a shaft 312 on which is loosely mounted a sprocket for the chain 302, said sprocket fixedly carrying a ratchet wheel 313.

At the other end of the lever 311 is disposed a pawl 314 which moves the ratchet wheel 313 and therewith the sprocket step by step forward in accordance with the rhythm of operation imparted to it by the lever 307. The locking pawl 315 prevents the undesired reverse rotation of the sprocket.

The drive is transmitted by the chain 302 to a shaft 316 on which a sprocket 317 is fixedly mounted. The latter operates with the aid of an auxiliary chain 318 a gear wheel 319 which meshes with a gear 320 on a shaft 321 carrying the sprocket 322 of the other chain 302, the upper end of which passes around a sprocket 323 mounted on a shaft 324.

It is to be noted that on each of the narrow sides of the pile there is provided such a chain 302 with noses 303 and 304 respectively, so that the carrier plate 305 for the wrapping sheets 306 is always carried by the noses 304 or 303 of the chains 302.

The longitudinal distance apart of the noses 303 and 304 is such that it approximately corresponds to the greatest possible height of pile, i. e. half the length of the chain.

Pivotally mounted at the upper arm of the lever 307 there is a suction arm 325, the head 326 of which has a slot 327 corresponding to the whole or part of the width of the wrapping sheet. When the lever 307 is operated the head 326 lifts the topmost sheet and brings it before the mouth of tongs 328, as shown in chain dotted lines in Fig. 60. This is brought about by the fact that when the upper part of the lever 307 recedes in clockwise direction a projection 550 at the rear part of the lever 325 slides along a control cam. During this movement the sprocket 313 and therewith the chain 302 are moved forward, provided the lever 311 is not removed from the range of the pusher 309 by a rod 329 pivoted on a journal 330 of a lever 331 mounted on a pivot 332 and carrying at its other end a feeler 333.

When the pile 306 moves upwards the arm 331 is rocked in anti-clockwise direction by the feeler 333, so that the rod 329 interrupts the engagement between the lever 311 and the pusher 309.

A spring 334 has the tendency to pull the lever 329 off the lever 311 in the direction of the arrow, which it is able to do whenever the height of the pile of wrapping sheets is reduced by the amount of the stroke of the feeler. The pusher 309 is able to operate the pawl 314 on any such occasion.

When the plate 305 has arrived from the bottom of the pile device to the top thereof, it is provisionally held apart from the noses 304 by carrier arms 335 and 336, which are mounted on pins 337 and 338 respectively and clear the way for the plate which has previously moved upwards, against the action of springs 339 and 340 respectively. The carrier arms are necessary, because the noses 304 move downwardly when a fresh plate 305 is placed on the other noses 303 of the chain 302 and a fresh pile of wrapping sheets is placed thereon.

In order that the noses 303 and then with them the plate 305 with the pile 306 may be brought into operative position, a hand wheel 341 with handle 342 is disposed on the shaft 316, with the aid of which the chain may be driven by hand.

As will be seen in Figs. 59 and 66, the mouth of the wrapping sheet conveyor tongs 328 is opened by an abutment 343 on the frame of the machine with the aid of a spring pressed lever 344 at the moment that the tongs 328 are above the pile of paper. As soon as the carrier chain or conveyor 345 moves the tongs 328 away from the pile in the direction of the lower arrow the lever 344 slips off the abutment 343, the mouth of the tongs 328 closes and grips a wrapping sheet which, as is the pile, is indicated by the reference numeral 306. Since the suction head 326 exerts a certain pull on the sheet 306, a take-off rocking lever 346 is provided, which carries a finger 347 adapted to pull off the paper when the lever 346 is rocked, in the manner shown in Fig. 59.

The lever 346 is rockably mounted on a pin 348 (Fig. 66) and has an arm 349 adapted to be operated by a pusher 350 fixed to a lever 351 pivoted to the frame at 352 and actuated by a rod 353 pivoted to its free end by a pin 354. The rod 353 has for a further object to remove the finished packed article from a gripping pocket 355 which it does by means of two wipers 356.

The wipers 356 are disposed at a distance apart corresponding to the width of the gripping pocket, in such a manner that they are rockable on a shaft 550 fixedly connected to a lever 357. The latter is mounted on a shaft 358 which also carries the sprocket 359 for the chain 345.

Mounted on the hub of the wipers 356 there is a lever 561 carrying at its end a roller 562 gliding along a guide curve 563 and causing the wiper 356 to take up a position at right angles to the longitudinal axis of the gripping pocket 355 (Fig. 66) and in addition to remove the finished package by the movement of the lever 357 by wiping movement along the gripping pocket. The packages are collected in a trough 564 on which index marks 565 are provided to divide it up into sections.

In addition to carrying the tongs 328, the chain 345 also carries the gripping pockets 355, which alternate with the tongs 328.

At the delivery end a cam 360 is provided which actuates against spring means an arm 361 of the gripping pocket 355, said arm being mounted on a pin 362 and terminating in the mouth 363 of the gripping pocket.

The chain 345 brings the wrapping sheets 306 along its lower run in the tongs 328 to the receiving end for the bags to be packed.

At this end the chain 345 is mounted on a wheel 364 keyed to a shaft 365. Mounted on the shaft 365 there is a lever 366 (Fig. 61) which forms a cam 367 for the arm 361 of each gripping pocket 355.

The operation of the arm is facilitated by the provision of a roller 368. The lever 366 has a nose 369 which is operated by a pusher 370 at the moment when the cam 367 is to be suddenly disengaged from the roller 368 for causing the mouth 363 of the gripping pocket 355 to be shut. The pusher 370 acts upon the nose 369 against the action of a spring 371.

The bag (infusion bag) to be packed is indicated at 267. It is removed from the chambers 373 of the clamp wheel 176 with the aid of tongs 375, which seize the head of the bag 267, same being released by positive action by the clamps of the clamp wheel which previously held the bag.

The tongs 375 are mounted on a slide 376 gliding in a guide 377.

The arms of the tongs (Fig. 65) are indicated at 378 and 379; they are pivotally mounted on pins 380 and 381 and engage one another through toothed segments 383 and 382. The arms 378 and 379 are thus operatively connected together and are rocked by means of a roller 384 running on a cam 385. Mounted on a pin of the arm 379 there is a rockable mouth member 387 and on a pin 388 of the arm 378 there is a mouth member 389, which are adapted to be opened against the action of springs 390 and 391 respectively when the cam discs 392 and 393 run on the cams 394 and 395 respectively of the carrier of the tongs.

Disposed in front of the aforesaid conveyor 345 (Figs. 59 and 61) there is a reversing wheel 425 which is fast on a shaft 426 and carries on its periphery receiving clamps 427 and 428 normally held closed by springs 429. The outer arm of the clamps is pivotally mounted on a pin 430 and has a lever 431 which runs on a cam disc 432. The cam disc 432 has a cam member 433 which opens the clamps 427 relatively to the clamp member 428 at the moment when the gripping clamp is level with a pocket of the clamp wheel in which the bag is located.

The cam 433 is connected to a lever 434 and is loosely mounted on the shaft 426 of the reversing wheel. After the bag has been introduced between the clamp members, the cam automatically releases the lever 431, owing to the fact that a pusher 435 connected to the drive of the tongs 375 strikes against the lever 434 thereby causing the lever 434 to move and rotate the cam 433 in anticlockwise direction away from the lever 431, so that the spring (not shown) of the clamps of the reversing wheel becomes operative and pulls member 427 towards the member 428, thereby gripping the bag.

The tongs slide 376 is driven through rods 396, 397, 398 by a lever arm 399 which is loosely mounted on a shaft 400 having an arm 401 actuated by a cam disc 402. The lever 399 has a third arm 403 which is pivoted with the aid of a link 404 to a slide 405 which carries a pusher for pushing the bag 267 into the gripping pocket 355 and which in addition carries the pusher 370. The pusher device is clearly illustrated in Fig. 64.

Mounted on the slide 405 there are lateral pushers 406 and 407, as well as holder clips 408 and 409, which are applied to the sides of the bag with a slight force when the slide moves in the direction of the arrow and the ends 410 and 411 cease to be in engagement with a cam 412 secured to the frame and are rocked upwardly around their pivots 414 and 415 by a spring 413 in such a manner that the arms 408 and 409 move inwardly.

These pushers 406 and 407 bring the bag 267 in cooperation with the pre-creasers and clip member 408 and 409, as shown in Fig. 59, from the clamps of the reversing wheel into a gripping pocket 355 which at this stage is opposite same, the wrapping paper 306 being held by one end of the tongs 328 which is in a forward position in the direction of movement. The bag 267 is connected with a label string 265 and this is fixed on a label 269.

As will be seen in Figs. 59 and 61, the wrapping paper introduced into the tongs 328 by the suction arm 326 is brought at the turning point of the conveyor above the opening of the next following gripping pocket 355, so that the paper is pulled into the pocket by the bag 267 introduced thereinto, being thereby folded in such a manner that the free end of the wrapping sheet 306 is level with the upper end of the gripping pocket, while the distance bridged by the sheet between the tongs 328 and the gripping pocket 355 forms the last end of the wrapping sheet.

As soon as the tongs 328 arrive above a cam 418 during the further movement of the conveyor in the direction of the arrow with their lever 344, the mouth of the tongs 328 is opened and releases the end of the wrapping sheet 306.

The tongs 328 are so disposed that they slightly cover the opening of the gripping pockets as the conveyor moves into the horizontal, as will be seen in Fig. 63, and turn the end of the sheet at an acute angle to the horizontal, as shown in Fig. 59.

In front of the crimping device, which comprises pairs of crimping wheels 419 and 420, guide rails 421 and 422 are provided, which fold the upper edge of the wrapping sheet entirely above the gripping pocket in question and hold together the projecting edges of the folded wrapping sheet.

The ejection of the package finished by the crimping has already been described. It is to be noted (see Fig. 63) that on the outer clamp member of the gripping pocket, which is subject to the action of a spring 423, a recess 424 is formed in the middle of the upper end which acts as string guide for the label string 265.

I claim:—

1. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag and means for wrapping the bag.

2. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming the strip into a bag around the filled core, means for closing the bag and means for wrapping the bag.

3. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming the strip into a bag around the filled core, a clamp wheel rotatable around a horizontal axis for receiving formed bags in its clamps, bag closing means disposed around said clamp wheel and means for wrapping the bag.

4. Machine for making, filling, closing and wrapping a bag comprising a vertical core wheel with a horizontal axis having a plurality of radial hollow cores for forming the bag therearound, means for introducing a substance to be contained by the bag prior to the formation thereof into one core at a time when same is in inclined position, means for feeding a strip of bag material to the filled core at right angles thereto when same is in a different inclined position, means for forming the strip into a bag around the filled core, gripping means on the core wheel for clamping the formed bag to the core until the bag is stripped therefrom, a clamp wheel rotatable around a horizontal axis for receiving the formed bag in its clamps, a cam disc on the shaft of the core wheel for controlling said gripping means, a cam disc on the shaft of said clamp wheel for controlling asid clamps, a central cam disc, a lever and crank system for operating said core wheel and clamp wheel cam discs from said central cam, closing means for the bag disposed around said clamp wheel and means for wrapping the bag.

5. Machine for making, filling, closing and wrapping a bag comprising a vertical core wheel with a horizontal axis having a plurality of radial hollow cores for forming the bag therearound, a hopper containing the substance to be filled in the bag, a pivoted plunger adapted to push the substance from the hopper into one core at a time when same is in inclined position, means for forming the bag around the filled core, means for closing the bag and means for wrapping the bag.

6. Machine for making, filling, closing and wrapping a bag comprising a vertical core wheel with a horizontal axis having a plurality of radial hollow cores for forming the bag therearound, a hopper containing the substance to be filled in the bag and having a closed bottom and a lateral discharge opening above said bottom, a pivoted plunger slidable on said bottom and adapted to push the substance from the hopper into one core at a time when same is in inclined position, means for forming the bag around the filled core, means for closing the bag and means for wrapping the bag.

7. Machine for making, filling, closing and wrapping a bag comprising a vertical core wheel with a horizontal axis having a plurality of radial hollow cores for forming the bag therearound, a movable hopper containing the substance to be filled into the bag, a pivoted plunger adapted to push the substance from the hopper into one core at a time when same is in inclined position, a lever operated by said plunger at the end of the filling stroke thereof for moving the hopper away from the filled core, means for forming the bag around the filled core, means for closing the bag and means for wrapping the bag.

8. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, rockable supporting and smoothing means for the incoming strip, means for forming the strip into a bag around the filled core, means for closing the bag and means for wrapping the bag.

9. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, means for forming lateral sides of the bag by folding the edges of the front and rear sides on to the core, fingers for knocking the portions of the strip projecting beyond the base area of the core between said front and rear side edges, means for closing the bag and means for wrapping the bag.

10. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, means for forming lateral sides of the bag by folding the edges of the front and rear sides on to the core, fingers for knocking the portions of the strip projecting beyond the base area of the core away from said front and rear side edges, means for closing the bag and means for wrapping the bag.

11. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, means for forming lateral sides of the bag by folding the edges of the front and rear sides on to the core and including rockable folding rails adapted to introduce said edges in longitudinally doubled up position into pairs of tongs which turn said doubled up edges on to the core to form bag side seams, means for closing the bag and means for wrapping the bag.

12. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, rockable folding rails for introducing the edges of the front and rear sides in longitudinally doubled up position into pairs of tongs mounted on pins eccentrically disposed in shafts and adapted to turn said doubled up edges on to the core to form the seams of the lateral sides of the bag, the mouth end of said pairs of tongs terminating flush with the centre lines of the lateral sides of the bag being formed, means for closing the bag and means for wrapping the bag.

13. Machine for making, filling, closing and wrapping a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip, a single piece arcuate staple former and a staple driver mounted on respective pivoted arms and together forming a cutting edge for severing a wire shaped portion from the metal strip, the former being adapted to form a staple of the portion and the driver to insert the staple into the bag, means for closing the bag and means for wrapping the bag.

14. Machine for making, filling, closing and wrapping a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip, a single piece arcuate staple former and a staple driver detachably and adjustably mounted on respective pivoted arms and together forming a cutting edge for severing a wire shaped portion from the metal strip, the former being adapted to form a staple of the portion and the driver to insert the staple into the bag, and means for closing the bag and means for wrapping the bag.

15. Machine for making, filling, closing and wrapping a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip, a single piece arcuate staple former, a spring pressed stop mounted in the staple former for limiting the feed movement of the metal strip, a staple driver, respective pivoted arms on which the staple driver and staple former are mounted, the staple former forming a staple of a wire shaped portion severed from the metal strip and the driver inserting the staple into the bag, means for closing the bag and means for wrapping the bag.

16. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core, means for folding the strip around the core to form the bag, a plurality of stapling units mounted in a common stapling head and adapted to form and introduce staples into the folded bag, each stapling unit comprising a single piece arcuate staple former and a staple driver mounted on respective pivoted arms and together forming a cutting edge for severing a wire shaped portion from the metal strip, the former being adapted to form a staple of the portion and the driver to insert the staple into the bag, means for closing the bag and means for wrapping the bag.

17. Machine for making, filling, closing and wrapping a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip of width equal to the length of staples to be formed, a single piece arcuate staple former and a staple driver mounted on respective pivoted arms and together forming a cutting edge for severing a wire shaped portion from the metal strip, the former being adapted to form a staple of the portion and the driver to insert the staple into the bag, means for closing the bag and means for wrapping the bag.

18. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core, means for folding the strip around the core to form the bag, means for obliquely feeding a metal strip, a single piece arcuate staple former and a staple driver mounted on respective pivoted arms and together forming a cutting edge for severing pointed wire shaped portions from the metal strip, the former being adapted to form a staple of each pointed portion and the driver to insert the pointed staple into the bag, means for closing the bag and means for wrapping the bag.

19. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving the formed bags in its clamps, a device for stripping the bag from the core for introduction into the clamps and including two slides mounted on slideways each having pivotally attached stripping blades adapted to engage the mouth of the bag, means for closing the bag and means for wrapping the bag.

20. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving the formed bags in its clamps, a device for stripping the bag from the core for introduction into the clamps and including two slides mounted on slideways each having stripping blades for engaging the mouth of the bag fixed to arms mounted on shafts having secured thereto control levers operable by a cam mounted on a cam operating roller bearing piece carrying guide rods for a folding rail for knocking inwardly the lateral side of the bag, means for closing the bag and means for wrapping the bag.

21. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving the formed bags in its clamps, a device for stripping the bag from the core for introduction into the clamps and including two slides mounted on slideways each having stripping blades for engaging the mouth of the bag fixed to arms mounted on shafts so that the point of intersection of the paths of the stripping blades is located in the centre line of the lateral sides of the bag outside the level of the front and rear sides of the bag, said shafts having secured thereto control levers operable by a cam mounted on a cam operating roller bearing piece carrying guide rods for a folding rail for knocking inwardly the lateral side of the bag, means for closing the bag and means for wrapping the bag.

22. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the mouth of the bag by folding including pivoted folding levers having pins engaging in adjusting and guide slots respectively of a connecting link, one of the levers having a rockable folding clamp and the other a fixed folding blade adapted to rock with its lever around the axis thereof at right angles to the direction of rotation of the clamp, the latter being actuated by a cam on the lever having the folding blade and means for wrapping the bag.

23. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the mouth of the bag by folding including pivoted folding levers having pins engaging in adjusting and guide slots respectively of a connecting link, one of the levers having a rockable folding clamp adapted to cooperate with a fixed plate at the end of said lever and the other lever having a fixed folding blade adapted to rock with its lever around the axis thereof at right angles to the direction of rotation of the clamp, the latter being adapted to be actuated by a cam on the lever having the folding blade and means for wrapping the bag.

24. Machine for making, filling, closing and wrapping a bag, comprising a vertical core wheel with a horizontal axis having a plurality of radial hollow cores for forming the bag therearound, means for introducing the substance to be contained by the bag prior to the formation thereof, into one core at a time when same is in inclined position, means for forming the bag around the filled core, means for closing the bag by folding its mouth, means for pre-perforating the mouth fold for the reception of staples and means for wrapping the bag.

25. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag by folding its mouth, means for pressing flat and pre-perforating the mouth fold for the reception of staples including two pivoted levers connected by a link one lever having perforating means and the other lever and a spring plate disposed between the levers having holes for accommodating said perforating means and means for wrapping the bag.

26. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag by folding its mouth, means for pressing flat and pre-perforating the mouth fold for the reception of staples, means for stapling the mouth fold, a feeler in combination with said flat pressing and pre-perforating means for cutting out the mouth fold stapling means when a bag fails to be engaged by said flat pressing and pre-perforating means and means for wrapping the bag.

27. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, rockable means for stapling the folded mouth, means for feeding a label string to said stapling means in one position thereof, said string being adapted to be placed around the mouth fold when said stapling means are rocked into the other position and means for wrapping the bag.

28. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, means for stapling the mouth fold, means for attaching one end of a label string to the mouth fold, means for attaching a label to the other end of the string, a label pile holder having its discharge end offset in the label discharge direction with reference to its longitudinal axis and means for wrapping the bag.

29. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, means for stapling the mouth fold, means for attaching one end of a label string to the mouth fold, means for attaching a label to the other end of the string, means for guiding, holding and severing the label end of the string and conveying it to the label fixing means and means for wrapping the bag.

30. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, means for stapling the mouth fold, means for attaching one end of a label string to the mouth fold, means for attaching a label to the other end of the string, adjustable string guides for determining the length of the string and means for wrapping the bag.

31. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag, means for attaching one end of a string to the closure of the bag said string having a label fixed to its other end, and means for wrapping the bag including a conveyor element fitted with alternately disposed cam controlled gripping pockets for temporarily receiving the bags and cam controlled wrapping sheet holder tongs, the bags serving as folding cores for the wrapping sheets and the pockets serving as folding sheaths.

32. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving formed bags in its clamps, bag closing means and means for attaching one end of a string having a label at its other end to the closure of the bag disposed around said clamp wheel, a reversing clamp wheel adapted to receive bags in its clamps from the clamps of the clamp wheel and means for wrapping the bag including a conveyor element fitted with gripping pockets for receiving bags from the clamps of the reversing clamp wheel when both said pockets and said clamps are inclined to the horizontal so as to cause the string to be laid longitudinally around the bag, said conveyor element being also fitted with wrapping sheet holder tongs alternating with said gripping pockets, the bags serving as folding cores for the wrapping sheets and the pockets serving as folding sheaths.

33. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving formed bags in its clamps, bag closing means and means for attaching one end of a string having a label at its other end to the closure of the bag disposed around said clamp wheel, a reversing clamp wheel adapted to receive bags in its clamps with the label string carrying closure of the bag entering same first from the clamps of the clamp wheel and means for wrapping the bag including a conveyor element fitted with gripping pockets for receiving bags with the bottom of the bags entering first from the clamps of the reversing clamp wheel so as to cause said label string to become longitudinally placed around the bag during the passage of same into, through and from said reversing wheel into said gripping pockets, said conveyor element being also fitted with wrapping sheet holder tongs alternating with said gripping pockets, the bags serving as folding cores for the wrapping sheets and the pockets serving as folding sheaths.

34. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving formed bags in its clamps, means for closing the bag while in the clamps of the clamp wheel, means for wrapping the bag, a reversing clamp wheel for conveying the bag from said clamp wheel to said wrapping means and guiding and conveying tongs for guiding and conveying the bag from said clamp wheel to said reversing clamp wheel.

35. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving formed bags in its clamps, means for closing the bag while in the clamps of the clamp wheel, means for wrapping the bag including gripping pockets disposed on a conveyor element alternately with wrapping sheet holder tongs, a reversing clamp wheel for conveying the bag from said clamp wheel to said wrapping means and pusher members for facilitating the introduction of the bag into the gripping pocket of the wrapping means, said pusher members having rockable lateral cam controlled holder arms adapted to engage the crease in the lateral sides of the bag.

36. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag, and means for wrapping the bag including a conveyor element fitted with gripping pockets for the bags alternating with wrapping sheet holder tongs overlapping the mouths of the bags when both pockets and tongs are on the horizontal runs of the conveyor element, the bags serving as folding cores for the wrapping sheets and the pockets serving as folding sheaths.

37. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag, means for attaching one end of a string carrying a label at its other end to the closure of the bag and means for wrapping the bag including a conveyor element fitted with alternately disposed cam controlled gripping pockets for the bags and cam controlled wrapping sheet holder tongs having a string guiding recess in their outer jaws, the bags serving as folding cores for the wrapping sheets and the pockets serving as folding sheaths.

38. Machine for making, filling, closing and wrapping a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag, means for attaching one end of a string carrying a label at its other end to the closure of the bag and means for wrapping the bag in a sheet of wrapping material folded in U-shape around the bag with a flap extending beyond the upper end of one limb of the U at the closed bag mouth, said wrapping means including pairs of crimping wheels for crimping the limbs of the U together on both sides and guide rails in front of the crimping wheels adapted to fold said flap over on to one limb of the U and to hold said limbs together for the crimping operation.

39. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag and means for wrapping the bag including wrapping sheet feed apparatus having a wrapping sheet pile holding bottom member removably supported by brackets fixed to automatically advanced endless conveyor chains for moving said bottom member upwardly with the pile thereon, each conveyor chain having two brackets the spacing of which corresponds to half the length of the chain.

40. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag and means for wrapping the bag including wrapping sheet feed apparatus having a wrapping sheet pile holding bottom member removably supported by brackets fixed to endless conveyor chains automatically advanced by a pawl and ratchet device for moving said bottom member upwardly with the pile thereon, said pawl and ratchet device having combined therewith a suction arm for lifting the uppermost wrapping sheet from the pile.

41. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag and means for wrapping the bag including wrapping sheet feed apparatus having a wrapping sheet pile holding bottom member removably supported by brackets fixed to endless conveyor chains for moving said bottom member upwardly with the pile thereon, said conveyor chains being automatically advanced by a pawl and ratchet device controlled by a feeler adapted to be operated by the uppermost sheet of the pile with a view to cutting out said pawl and ratchet device.

42. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag and means for wrapping the bag including a conveyor element fitted with alternately disposed cam controlled gripping pockets for the bags and cam controlled wrapping sheet holder tongs, a wrapping sheet feed apparatus having a wrapping sheet pile holding bottom member removably supported by brackets fixed to automatically advanced endless conveyor chains for moving said bottom member upwardly with the pile thereon, a suction arm for lifting the uppermost wrapping sheet in readiness for gripping by said wrapping sheet holder tongs and a pivoted arm for pulling the sheet gripped at one end by the tongs off the pile at a faster rate than the sheet was pulled off owing to movement of the tongs with the conveyor element.

43. Machine for making, filling, closing and wrapping a bag comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag, means for wrapping the bag and means for ejecting the wrapped bag including an ejector member controlled by a cam plate and adapted to push the bag out of a downwardly open gripping pocket brought along by a conveyor element into a delivery trough.

44. A machine provided with a hollow core wheel for the making of bags around a hollow core adapted for the introducing of the substance with which the bags are to be filled, comprising a hollow core wheel and coacting hollow cores, said hollow core wheel having its axis arranged horizontally, and said hollow cores being disposed in radial positions diverging from the core wheel whereby the substance to be filled into the bags may be introduced into the radial directed mouth opening of the hollow core wheel, and the bag subsequently formed around the coating hollow core in such a manner that the filling opening is thereby closed, and whereby the bag may be stripped off from the core wheel in a direction opposed to the direction of introduction, with the bag open on one end.

45. A machine provided with a hollow core wheel for the manufacture of a bag around the core and for introducing the substance to be contained in the bag, comprising a hollow core wheel and coacting hollow cores, said hollow cores operating as a filling device for the filling of the bag, said filling device being arranged in such a position that the hollow core, with respect to which the bags are to be placed and filled, is positioned at substantially 45°, in an upward, inclined direction to receive a filling and subsequently, with a bag therearound, is positioned at substantially 45° in a downward inclined direction for removal of the bag with the substance therein, the core having moved through substantially 270° for having the bag manufactured therearound.

46. A machine with a hollow core wheel for the production of bags around the core and for filling the material into the core, comprising a hollow core wheel and coacting hollow cores, a device for filling the core including a movable filling funnel, a filling plunger operative therein, a lever mechanism actuated by said plunger at the end of its working stroke for moving the filling funnel from the mouth of the hollow core wheel after the filling operation.

47. A machine of the class described comprising a hollow core wheel mounted to revolve about a substantially horizontal axis, hollow cores carried by the hollow core wheel for the production of bags around a hollow core and for filling the substance to be contained in the bags into the hollow core, a station, means for supplying a paper cover for forming the bags so characterized that the relation of the hollow core wheel is positioned to revolve on a horizontal axis with respect to the station which supplies the paper cover for the bags is such that the paper is moved forward on a downwardly inclined surface, and that this surface is arranged substantially at right angles to the longitudinal axis of the hollow core which is simultaneously positioned at the same angle substantially as set forth so that the paper covers substantially the mouth of the filling opening of the core.

48. A machine of the class described comprising a hollow core wheel, hollow cores carried by said hollow core wheel, means for forming a bag around the hollow core and for filling the substance to be subsequently contained in the bag into the hollow core, a bag forming station including a set of four paper supporting angles, a pair of preforming plates, a paper supply, and positioning shoes; a second station including a multiplicity of pockets, means for supplying sheets of wrapping paper at the second station so characterized that at the bag forming station the hollow core is surrounded by the four paper supporting angles which are arranged on the preforming plates for the purpose of placing a sheet of paper from the paper supply around the hollow core, the opposed edges of the sheet of paper being "properly positioned" or "phased", and the shoes being positioned somewhat in the rear of the direction of introduction, for the purpose of positively insuring running up and proper placement of the paper sheet.

49. A machine of the class described comprising a hollow core wheel, hollow cores carried by said hollow core wheel, and means for producing a paper bag around the hollow core after filling the substance to be contained in the bag into the core wheel including paper supporting angles provided with laterally movable clips which serve as a means for aligning the paper which is consequently carried thereto.

50. A machine of the class described including a hollow core wheel, hollow core members carried thereby, means for producing a bag around the hollow core members and introducing the substance to be filled in the bags, a clamp wheel provided with pockets opening in a radial direction and coacting with said hollow core wheel for carrying said bags around an arc of substantially 270°, means for journaling said hollow core wheel and said clamp wheel on horizontal axes, means for stripping the filled bags from the hollow core wheel and delivering the filled bags to said clamp wheel downwardly at an angle of substantially 45°, and means on the clamp wheel for gripping the filled bags as the same are stripped off from the hollow core wheel and finally closing the open end of the bag, said bags being discharged from said clamp wheel downwardly at an angle of substantially 45°.

51. A machine of the class described comprising a hollow core wheel, hollow core members carried thereby, means for producing bags around the core members and introducing the material to be contained within the bag, means for stripping off the bag from the core members which consists of a pair of members and a pair of coacting stripping blades for stripping the bag from the core member, a clamp wheel having a series of bag receiving pockets around the periphery thereof, and means for delivering the filled bags to the pockets of the clamp wheel.

52. In a machine of the class described, a hollow core wheel, hollow core members coacting therewith, said hollow core members forming means for filling bags with material delivered through said hollow core wheels, a device for stripping off filled bags from the hollow core members, said device operating simultaneously for folding in the open end of the bag and comprising a pair of slides, a pair of coacting stripping blades and a folding rail operating to fold in the two opposite small sides of the bag after the bag is stripped from the core member.

53. A device for stripping off filled bags from a hollow core wheel which serves simultaneously for folding the open end of the bag, as set forth in claim 52 wherein the stripping blades have arms positioned upon an appropriate axis and adapted to approach when the small sides of the bag are folded in a sack-like manner, thus guiding the broad sides of the bag against the folding rails.

54. In a machine of the class described for wrapping bags and the like, having a substantially tapered contour in a sheet of paper, a rotary conveyor having receiving pockets therein, an endless conveyor having pockets for receiving filled bags, means for feeding sheets of wrapping paper to the pockets of said endless conveyor, a reversing wheel disposed intermediate said rotary conveyor and said endless conveyor, said reversing wheel being provided with bag receiving pockets, means for transferring filled bags from said rotary conveyor to the pockets of said reversing wheel with the tapered end of the bag forward as the bag leaves the rotary conveyor and from which the bags after a rotation of the reversing wheel are advanced with the broad end forward and simultaneously moving the sheet of wrapping paper with the bags into the pockets of the endless conveyor and means associated with said endless conveyor for wrapping the bag.

55. A machine of the class described for enclosing bags of substantially wedge-shaped contour with a label and holding thread thereon near the closed end of the bag within a sheet of paper comprising a rotary conveyor having pockets for receiving and advancing filled bags, means for attaching a holding thread having a label fastened thereon to the bag, said bag being positioned relatively to the pockets of the rotary conveyor with the open end outwardly, an endless conveyor carrying pockets for receiving the filled bags while simultaneously applying a sheet of wrapping paper to the bag for wrapping the same, a reversing wheel interposed between the rotary conveyor and the endless conveyor, said reversing wheel having pockets into which the bag is pushed carrying the free hanging end of the thread in advance whereby the thread positions itself to lay on one side of the bag, and means for ejecting the bags from the pockets in the reversing wheel after one rotation of the reversing wheel and moving with each bag an individual sheet of wrapping paper into the pockets of the endless conveyor in such a manner that the thread is wrapped around the bag.

56. A machine of the class described for enclosing bags of substantially wedge-shaped contour each having a label attached thereto by means of a fastening thread onto the end of the bag, comprising in combination a rotary conveyor having pockets carrying filled bags, an endless conveyor having bag receiving pockets therein, a reversing wheel disposed between said rotary conveyor and said endless conveyor, means for wrapping a thread around the bag in such a manner that the bag is transferred from a downwardly inclined pocket of the rotary conveyor into a pocket of the reversing wheel, the pocket of the reversing wheel being provided with an opening directed diagonally upwards whereby the free hanging end of the thread lies on the lower side of the bag, said reversing wheel being movable in such direction that the pocket therein into which the bag is deposited is disposed in a position where its opening is firstly directed in an inclined downward direction and subsequently moved angularly in an upward direction, thereby laying the thread onto the lower small side of the bag so that the bag is finally deposited into the pocket of the endless conveyor in an upwardly disposed diagonal position, and means coacting with said endless conveyor for progressively wrapping the bag.

57. A machine for enclosing substantially wedge-shaped bags with a label fastened by means of a thread onto the end of the bag, comprising means for conveying bags to be enclosed, pockets formed in said means, guiding and gripping tongs adapted to grip the bags in said pockets, a reversing wheel having pockets therein, means for enclosing the bag within a sheet of paper, and means coacting with said guiding and conveying tongs for transferring the bag to a pocket in said reversing wheel.

58. In a machine of the class described, a conveying chain having wrapping devices thereon, each of said devices being provided with pockets for the reception of the goods to be wrapped and tongs for holding a paper wrapping sheet, means for supporting and driving said chain so characterized that said paper holding tongs are carried by the conveying chain, adapted to be successively positioned during their paths around the chain driving means, during which action said tongs operate to hold a sheet of wrapping paper over or near the opening of the mouth of the pocket, thus allowing the pushing in of the bag within the pocket, said tongs operating during the horizontal straight run of the chain to effect a folding operation.

59. In a machine of the class described, a device having a gripping pocket for receiving a sheet of wrapping paper surrounding the article to be wrapped, and a gripping pocket claw substantially in the middle thereof, said gripping pocket claw having a recess for guiding a thread member with respect to the wrapped article.

60. A machine of the class described comprising in combination with a device for enclosing a bag, a pair of guiding rails disposed ahead of the device, a gripping pocket for receiving a sheet of wrapping paper, means coacting with said guiding rails to fold over the upper edge of the sheet of wrapping paper onto the gripping pocket and means for holding together the lateral edges of the folded sheet of wrapping paper preparatory to a crimping operation.

61. In a machine of the class described including means for filling an open ended bag, means for holding the filled bag in a predetermined position, a pair of stripping blades engaging the sides of the filled bag, and an intermediate folding rail engageable with the central portion of the upper open end of the filled bag, said folding rails being movable inwardly against the upper portions of the sides of the filled bag for folding the ends of the filled bag enclosing the open end of the bag.

62. In a machine of the class described, means for filling a bag, a rotary member having radially disposed pockets therein for delivering a closed bag to a wrapping station, a conveyor, bag engaging means on said conveyor, and a reversing wheel disposed intermediate one end of said conveyor and said rotary member, said reversing wheel having pockets therein for receiving the bags from the rotary member in one position and delivering the bag to the pockets in the bag engaging means carried by the conveyor in another position.

63. A machine of the class described comprising in combination, a rotary support carrying filled bags, each having a thread and label carried therewith, a conveyor, bag engaging means disposed in spaced positions along the conveyor, and a reversing wheel interposed between one end of the conveyor and said rotary support, means for delivering individual sheets of wrapping paper adjacent the bag engaging means on said conveyor at the receiving end of the conveyor, means controlled by said reversing wheel for receiving the filled bags from said rotary support and delivering the filled bags with the thread properly aligned with respect thereto to the bag engaging means on said conveyor, and means coacting with said conveyor for progressively wrapping the filled bag as the bag is advanced by said conveyor.

64. In a machine of the class described, means for wrapping filled bags comprising in combination a rotary member having pockets therein for advancing filled bags of material, each having a thread fastened thereon, an endless conveyor having a receiving end and a discharge end, bag engaging means disposed in spaced positions along said conveyor, a reversing wheel interposed between the receiving end of said conveyor and said rotary member, said reversing wheel having bag receiving pockets formed therein in positions aligned with the pockets in said rotary member and the bag engaging means on said conveyor, means for delivering sheets of wrapping paper adjacent the receiving end of said conveyor for effecting a progressive wrapping operation of the filled bags, and means for aligning the filled bags in effecting transfer from said rotary member to said reversing wheel and to the bag engaging means on said conveyor whereby the thread attached to the bag extends clear of the wrapper applied to the bag.

65. A machine of the class described comprising a hollow core wheel journaled on a horizontal axis, a plurality of coacting radially disposed hollow cores for forming a bag therearound, means for filling said hollow cores with substance to be contained by the bag prior to the formation thereof, means for introducing sheet material to be formed into bags, means for forming bag material about said hollow cores, means for introducing substance contained within the hollow cores into the bag formed therearound, means for closing the end of the bag, means for attaching one end of a label string to the closed end of the bag, and means for conveying the closed bag into a delivery trough.

66. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, and means for closing the bag.

67. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming the strip into a bag around the filled core, and means for closing the bag.

68. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming the strip into a bag around the filled core, a clamp wheel rotatable around a horizontal axis for receiving formed bags in its clamps, and bag closing means disposed around said clamp wheel.

69. A machine for making, filling and closing a bag comprising a vertical core wheel with a horizontal axis having a plurality of radial hollow cores for forming the bag therearound, means for introducing a substance to be contained by the bag prior to the formation thereof into one core at a time when same is in inclined position, means for feeding a strip of bag material to the filled core at right angles thereto when same is in a different inclined position, means for forming the strip into a bag around the filled core, gripping means on the core wheel for clamping the formed bag to the core until the bag is stripped therefrom, a clamp wheel rotatable around a horizontal axis for receiving the formed bag in its clamps, a cam disc on the shaft of the core wheel for controlling said gripping means, a cam disc on the shaft of said clamp wheel for controlling said clamps, a central cam disc, a lever and crank system for operating said core wheel and clamp wheel cam discs from said central cam, and closing means for the bag disposed around said clamp wheel.

70. A machine for making, filling and closing a bag comprising a vertical core wheel with a horizontal axis having a plurality of radial hollow cores for forming the bag therearound, a hopper containing the substance to be filled in the bag, a pivoted plunger adapted to push the substance from the hopper into one core at a time when same is in inclined position, means for forming the bag around the filled core and means for closing the bag.

71. A machine for making, filling and closing a bag comprising a vertical core wheel with a horizontal axis having a plurality of radial hollow cores for forming the bag therearound, a hopper containing the substance to be filled in the bag and having a closed bottom and a lateral discharge opening above said bottom, a pivoted plunger slidable on said bottom and adapted to push the substance from the hopper into one core at a time when same is in inclined position, means for forming the bag around the filled core and means for closing the bag.

72. A machine for making, filling, and closing a bag comprising a vertical core wheel with a horizontal axis having a plurality of radial hollow cores for forming the bag therearound, a movable hopper containing the substance to be filled into the bag, a pivoted plunger adapted to push the substance from the hopper into one core at a time when same is in inclined position, a lever operated by said plunger at the end of the filling stroke thereof for moving the hopper away from the filled core, means for forming the bag around the filled core and means for closing the bag.

73. A machine for making, filling and closing a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, rockable supporting and smoothing means for the incoming strip, means for forming the strip into a bag around the filled core and means for closing the bag.

74. A machine for making, filling and closing a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, means for forming lateral sides of the bag by folding the edges of the front and rear sides on to the core, fingers for knocking the portions of the strip projecting beyond the base area of the core between said front and rear side edges and means for closing the bag.

75. A machine for making, filling and closing a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, means for forming lateral sides of the bag by folding the edges of the front and rear sides on to the core, fingers for knocking the portions of the strip projecting beyond the base area of the core away from said front and rear side edges, and means for closing the bag.

76. A machine for making, filling and closing a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, means for forming lateral sides of the bag by folding the edges of the front and rear sides on to the core and including rockable folding rails adapted to introduce said edges in longitudinally doubled up position into pairs of tongs which turn said doubled up edges on to the core to form bag side seams, and means for closing the bag.

77. A machine for making, filling and closing a bag comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core at right angles thereto when same is in a different inclined position, means for forming front and rear sides of the bag by folding the strip up on the core, rockable folding rails for introducing the edges of the front and rear sides in longitudinally doubled up position into pairs of tongs mounted on pins eccentrically disposed on shafts and adapted to turn said doubled up edges on to the core to form the seams of the lateral sides of the bag, the mouth end of said pairs of tongs terminating flush with the centre lines of the lateral sides of the bag being formed, and means for closing the bag.

78. A machine for making, filling and closing a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip, a single piece arcuate staple former and a staple driver mounted on respective pivoted arms and together forming a cutting edge for severing a wire shaped portion from the metal strip, the former being adapted to form a staple of the portion and the driver to insert the staple into the bag, and means for closing the bag.

79. A machine for making, filling and closing a bag comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip, a single piece arcuate staple former and a staple driver detachably and adjustably mounted on respective pivoted arms and together forming a cutting edge for severing a wire shaped portion from the metal strip, the former being adapted to form a staple of the portion and the driver to insert the staple into the bag, and means for closing the bag.

80. A machine for making, filling and closing a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip, a single piece arcuate staple former, a spring pressed stop mounted in the staple former for limiting the feed movement of the metal strip, a staple driver, respective pivoted arms on which the staple driver and staple former are mounted, the staple former forming a staple of a wire shaped portion severed from the metal strip and the driver inserting the staple into the bag, and means for closing the bag.

81. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core, means for folding the strip around the core to form the bag, a plurality of stapling units mounted in a common stapling head and adapted to form and introduce staples into the folded bag, each stapling unit comprising a single piece arcuate staple former and a staple driver mounted on respective pivoted arms and together forming a cutting edge for severing a wire shaped portion from the metal strip, the former being adapted to form a staple of the portion and the driver to insert the staple into the bag, and means for closing the bag.

82. A machine for making, filling and closing a bag, comprising a vertical core wheel with a horizontal axis having a plurality of radial hollow cores for forming the bag therearound, means for introducing the substance to be contained in the bag prior to the formation thereof into one core at a time when same is in inclined position, means for feeding a strip of bag material to the filled core, means for folding the strip around the core to form the bag, means for feeding a metal strip of width equal to the length of staples to be formed, a single piece arcuate staple former and a staple driver mounted on respective pivoted arms and together forming a cutting edge for severing a wire shaped portion from the metal strip, the former being adapted to form a staple of the portion and the driver to insert the staple into the bag, and means for closing the bag.

83. A machine for making, filling, and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for feeding a strip of bag material to the filled core, means for folding the strip around the core to form the bag, means for obliquely feeding a metal strip, a single piece arcuate staple former and a staple driver mounted on respective pivoted arms and together forming a cutting edge for severing pointed wire shaped portions from the metal strip, the former being adapted to form a staple of each pointed portion and the driver to insert the pointed staple into the bag, and means for closing the bag.

84. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving the formed bags in its clamps, a device for stripping the bag from the core for introduction into the clamps and including two slides mounted on slideways each having pivotally attached stripping blades adapted to engage the mouth of the bag, and means for closing the bag.

85. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving the formed bags in its clamps, a device for stripping the bag from the core for introduction into the clamps and including two slides mounted on slideways each having stripping blades for engaging the mouth of the bag fixed to arms mounted on shafts having secured thereto control levers operable by a cam mounted on a cam operating roller bearing piece carrying guide rods for a folding rail for knocking inwardly the lateral side of the bag, and means for closing the bag.

86. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, a clamp wheel rotatable around a horizontal axis for receiving the formed bags in its clamps, a device for stripping the bag from the core for introduction into the clamps and including two slides mounted on slideways each having stripping blades for engaging the mouth of the bag fixed to arms mounted on shafts so that the point of intersection of the paths of the stripping blades is located in the centre line of the lateral sides of the bag outside the level of the front and rear sides of the bag, said shafts having secured thereto control levers operable by a cam mounted on a cam operating roller bearing piece carrying guide rods for a folding rail for knocking inwardly the lateral side of the bag, and means for closing the bag.

87. A machine for making, filling and closing a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, and means for closing the mouth of the bag by folding including pivoted folding levers having pins engaging in adjusting and guide slots respectively of a connecting link, one of the levers having a rockable folding clamp and the other a fixed folding blade adapted to rock with its lever around the axis thereof at right angles to the direction of rotation of the clamp, the latter being actuated by a cam on the lever having the folding blade.

88. A machine for making, filling and closing a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, and means for closing the mouth of the bag by folding including pivoted folding levers having pins engaging in adjusting and guide slots respectively of a connecting link, one of the levers having a rockable folding clamp adapted to cooperate with a fixed plate at the end of said lever and the other lever having a fixed folding blade adapted to rock with its lever around the axis thereof at right angles to the direction of rotation of the clamp, the latter being adapted to be actuated by a cam on the lever having the folding blade.

89. A machine for making, filling and closing a bag, comprising a vertical core wheel with a horizontal axis having a plurality of radial hollow cores for forming the bag therearound, means for introducing the substance to be contained by the bag prior to the formation thereof, into one core at a time when same is in inclined position, means for forming the bag around the filled core, means for closing the bag by folding its mouth, and means for pre-perforating the mouth fold for the reception of securing means.

90. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag by folding its mouth, and means for pressing flat and pre-perforating the mouth fold for the reception of staples including two pivoted levers connected by a link one lever having perforating means and the other lever and a spring plate disposed between the levers having holes for accommodating said perforating means.

91. A machine for making, filling and closing a bag, comprising a vertical core wheel with a horizontal axis having a plurality of radial hollow cores for forming the bag therearound, means for introducing the substance to be contained by the bag prior to the formation thereof into one core at a time when same is in inclined position, means for forming the bag around the filled core, means for closing the bag by folding its mouth, means for pressing flat and pre-perforating the mouth fold for the reception of staples, and means for stapling the mouth fold, a feeler in combination with said flat pressing and pre-perforating means for cutting out the mouth fold stapling means when a bag fails to be engaged by said flat pressing and pre-perforating means.

92. A machine for making, filling and closing a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, rockable means for stapling the folded mouth, and means for feeding a label string to said stapling means in one position thereof, said string being adapted to be placed around the mouth fold when said stapling means are rocked into the other position.

93. A machine for making, filling and closing a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, means for stapling the mouth fold, means for attaching one end of a label string to the mouth fold, means for attaching a label to the other end of the string, and a label pile holder having its discharge end offset in the label discharge direction with reference to its longitudinal axis.

94. A machine for making, filling and closing a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, means for stapling the mouth fold, means for attaching one end of a label string to the mouth fold, means for attaching a label to the other end of the string, and means for guiding, holding and severing the label end of the string and conveying it to the label fixing means.

95. A machine for making, filling and closing a bag, comprising a vertical core wheel with a horizontal axis having a plurality of radial hollow cores for forming the bag therearound, means for introducing the substance to be contained by the bag prior to the formation thereof into one core at a time, when same is in inclined position, means for forming the bag around the filled core, means for closing the bag by folding its mouth, means for stapling the mouth fold, and means for attaching one end of a label string to the mouth fold, means for attaching a label to the other end of the string, adjustable string guides for determining the length of the string.

ADOLF RAMBOLD.